US011591419B2

(12) United States Patent
Ho et al.

(10) Patent No.: US 11,591,419 B2
(45) Date of Patent: *Feb. 28, 2023

(54) PROCESSES FOR POLYMERIZING INTERNAL OLEFINS AND COMPOSITIONS THEREOF

(71) Applicant: ExxonMobil Technology and Engineering Company, Annandale, NJ (US)

(72) Inventors: Suzzy C. H. Ho, Princeton, NJ (US); Christian E. Padilla, Mountain View, CA (US); Aaron Sattler, Annandale, NJ (US); Michele Paccagnini, Randolph, NJ (US)

(73) Assignee: Exxon Mobil Technology and Engineering Company, Annandale, NJ (US)

( * ) Notice: Subject to any disclaimer, the term of this patent is extended or adjusted under 35 U.S.C. 154(b) by 416 days.

This patent is subject to a terminal disclaimer.

(21) Appl. No.: 16/705,319

(22) Filed: Dec. 6, 2019

(65) Prior Publication Data

US 2020/0181295 A1 Jun. 11, 2020

Related U.S. Application Data

(60) Provisional application No. 62/776,601, filed on Dec. 7, 2018.

(51) Int. Cl.
*C08F 4/70* (2006.01)
*C08F 4/80* (2006.01)
(Continued)

(52) U.S. Cl.
CPC ............... *C08F 4/06* (2013.01); *C08F 10/14* (2013.01); *C10M 107/10* (2013.01);
(Continued)

(58) Field of Classification Search
CPC ...... C08F 4/7006; C08F 4/80; C08F 2410/04; C08F 10/08; C08F 10/14; C10M 107/10; C10M 107/42
See application file for complete search history.

(56) References Cited

U.S. PATENT DOCUMENTS 3,036,003 A  5/1962 Verdol
3,172,892 A  3/1965 Le Suer et al.
(Continued)

FOREIGN PATENT DOCUMENTS

EP    1040115 B1   6/2004
JP    2000169401 A 6/2000
WO    99/31113 A1  6/1999

OTHER PUBLICATIONS

Wang, F.; Tanaka, R.; Li, Q.; Nakayama, Y.; Shiono, T. Organometallics 2018, 37, 1358-1367. (Year: 2018).*
(Continued)

*Primary Examiner* — Rip A Lee
(74) *Attorney, Agent, or Firm* — C. Tumey Law Group PLLC

(57) ABSTRACT

The present disclosure provides base stocks and processes for producing such basestocks by polymerizing internal olefins. The present disclosure further provides base stocks, comprising low molecular weight polyolefin products, having one or more of improved flow, low temperature properties, and thickening efficiency. The present disclosure further provides polyolefin products useful as base stocks and or diesel fuel. In at least one embodiment, a process includes introducing a feedstream comprising $C_4$-$C_{30}$ internal-olefins with a catalyst system comprising a nickel diimine catalyst optionally in the presence of a solvent. The method includes obtaining a $C_6$-$C_{100}$ polyolefin product having one or more of a carbon fraction of epsilon-carbons
(Continued)

of from about 0.08 to about 0.3, as determined by $^{13}$C NMR spectroscopy, based on the total carbon content of the polyolefin product.

48 Claims, 12 Drawing Sheets

(51) Int. Cl.
    C08F 10/14 (2006.01)
    C10M 107/10 (2006.01)
    C08F 4/06 (2006.01)
    C10M 107/42 (2006.01)
    C08F 10/08 (2006.01)

(52) U.S. Cl.
    CPC ......... *C10M 107/42* (2013.01); *C08F 4/7006* (2013.01); *C08F 4/80* (2013.01); *C08F 10/08* (2013.01); *C08F 2410/03* (2013.01); *C08F 2410/04* (2013.01)

(56) References Cited

U.S. PATENT DOCUMENTS

| | | | |
|---|---|---|---|
| 3,219,666 | A | 11/1965 | Norman et al. |
| 3,316,177 | A | 4/1967 | Dorer, Jr. |
| 4,234,435 | A | 11/1980 | Meinhardt et al. |
| 4,317,948 | A | 3/1982 | Heckelsberg |
| 4,533,651 | A | 8/1985 | Masters et al. |
| 4,978,464 | A | 12/1990 | Coyle et al. |
| 5,545,792 | A | 8/1996 | Cox |
| 5,633,418 | A | 5/1997 | Sato et al. |
| 5,705,458 | A | 1/1998 | Roby et al. |
| 5,852,145 | A | 12/1998 | McLain et al. |
| 6,291,733 | B1 | 9/2001 | Small et al. |
| 6,897,272 | B1 | 5/2005 | Brookhart et al. |
| 7,056,997 | B2 | 6/2006 | Small et al. |
| 9,120,989 | B2 | 9/2015 | Freel et al. |
| 2013/0118059 | A1 | 5/2013 | Lange et al. |
| 2013/0130952 | A1 | 5/2013 | Luo et al. |
| 2017/0051222 | A1 | 2/2017 | Tang et al. |
| 2018/0105478 | A1 | 4/2018 | Lief et al. |
| 2020/0308316 | A1* | 10/2020 | Sattler .................. C10G 50/00 |

OTHER PUBLICATIONS

The International Search Report and Written Opinion of PCT/US2019/064830 dated Jun. 29, 2020.
Wang et al., "Chain-Walking Polymerization of Linear Internal Octenes Catalyzed by alpha-Diimine Nickel Complexes", Organometallics, vol. 37 (2018), pp. 1358-1367.
Wang et al., "Living polymerization of higher 2-alkene with alpha-diimine nickel catalysts: Synthesis and characterization of high molecular weight poly(2-alkene)s", Polymer, vol. 127 (2017), pp. 88-100.
Endo et al., "Polymerization of 2-Pentene with Ni(II) alpha-diimine Complex/M-MAO Catalyst and Structure of the Polymer", Journal of Polymer Science: Part A: Polymer Chemistry, vol. 46 (2008), pp. 2858-2863.
Leatherman et al., "Ni(II)-Catalyzed Polymerization of trans-2-Butene", Macromolecules, vol. 34 (2001), pp. 2748-2750.
Liu et al., "Mechanistic Studies of Palladium(II)-alpha-Diimine-Catalyzed Polymerizations of cis- and trans-2-Butenes", Organometallics, vol. 23 (2004), pp. 6099-6107.
Cherian et al., "Chiral anilines: development of C2-symmetric, late transition metal catalysts for isoselective 2-butene polymerization", ChemComm, (2003) pp. 2566-2567.
Nicolaides et al., "Unusual regioselectivity observed in the oligomerization of propene on nickel(II) ion-exchanged silica-alumina catalysts", Supported Catalysts and Their Applications—Royal Society of Chemistry, vol. 266 (2001), pp. 226-232.

Wang et al., "Late transition metal complexes bearing 2,9-bis(imino)-1,10-phenanthrolinyl ligands: synthesis, characterization and their ethylene activity", Journal of Organometallic Chemistry, vol. 658 (2002), pp. 62-70.
O'Connor et al., "Understanding the Insertion Pathways and Chain WalkingMechanisms of α-Diimine Nickel Catalysts for α-Olefin Polymerization: A 13C NMR Spectroscopic Investigation", Macromolecules, vol. 50 (2017), pp. 7010-7027.
Gao et al., "Oligomerization of 1-butene. III. Catalyst system containing nickel p-toluene sulfonate and nickel polystyrene sulfonate", Fenzi Cuihua, vol. 2 (1988), pp. 101-107.
Cao et al., "Oligomerization reaction of 1-butenes. (IX). Oligomerization reaction mechanism in nickel carboxylate/ethylaluminum chloride system", Gaodeng Xuexiao Huaxue Xuebao, vol. 14 (1993), pp. 1600-1604.
Cai et al., "Propene oligomerization catalyst derived from nickel sulfate supported on gamma-alumina", Applied Catalysis, vol. 69 (1991), pp. 1-13.
Munshieva, "Oligomerization of ethylene in the presence of some complexes of nickel with phosphorous hexaethyltriamide", Zhumal Prikladnoi Khimii, vol. 70 (1997), pp. 327-329.
Titova et al., "Catalysis of dimerization and oligomerization reactions of lower alkenes by systems based on Ni (PPh3)2(C2H4) and Ni(PPh3)nCl (n = 2 or 3)", Kinetics and Catalysis, vol. 55 (2014), pp. 35-46.
Foulds et al., "Catalytic olefin oligomerization activity of a series of trialkyl- and triphenylphosphine derivatives of the nickel(II) complexes of 4-thioxo-2-pentanoate and 2,4-pentanedithionate", Journal of Molecular Catalysis, vol. 87 (1994), pp. 117-136.
Sakakibara et al., "Oligomerization of olefins by nickel complexes. IV. Oligomerization of ethylene in the presence of bis(acetylacetonato)nickel(II) triethyldialuminum trichloride triphenylphosphine catalysts. Formation of C6-olefins", Nippon Kagaku Kaishi, vol. 5 (1974), pp. 910-914.
Brueckner et al., "The role of different Ni sites in supported nickel catalysts for butene dimerization under industry-like conditions", Journal of Catalysis, vol. 266 (2009), pp. 120-128.
Gehrke et al., "Complex catalysis. XXVI. Catalysis of the oligomerization of ethylene by cationic allylbis-ligand-nickel (II) hexafluorophosphate complexes", Journal of Organometallic Chemistry, vol. 304 (1986), pp. C4-C6.
Rishina et al., "New .alpha-diimine nickel complexes-Synthesis and catalysis of alkene oligomerization reactions", Journal of Molecular Catalysis A: Chemical, vol. 423 (2016), pp. 495-502.
Lutz, "Shell Higher Olefin Process", Journal of Chemical Education, vol. 1986, pp. 202-203.
Song et al., "Ionic liquid-supported bis-(salicylaldimine) nickel complexes: robust and recyclable catalysts for ethylene oligomerization in biphasic solvent system", Catalysis Letters, vol. 131 (2009), pp. 566-573.
Gao et al., "Living/controlled polymerization of 4-methyl-1-pentene with α-diimine nickel-diethylaluminium chloride: effect of alkylaluminium cocatalysts", Polymer Chemistry, vol. 2 (2011), pp. 1398-1403.
Nelkenbaum et al., "Synthesis and Molecular Structures of Neutral Nickel Complexes. Catalytic Activity of (Benzamidinato)(acetylacetonato)nickel for the Addition Polymerization of Norbornene, the Oligomerization of Ethylene, and the Dimerization of Propylene", Organometallics, vol. 24 (2005), pp. 2645-2659.
Behr et al., "Highly Selective Dimerization and Trimerization of Isobutene to Linearly Linked Products by Using Nickel Catalysts", Chemistry—An Asian Journal, vol. 9 (2014), pp. 596-601.
Bennett et al., "Synthesis of heterogeneous olefin-oligomerization catalysts using homogeneous nickel-chelate complexes as a basis", Polyhedron, vol. 9 (1990), pp. 2823-2831.
Brunet et al., "Cationic (μ3-allyl)metal complexes: Part XIV1. catalytic oligomerisation of ethylene: a very selective dbmerisation catalyst prepared from [(μ3-methallyl)ni(cod)]pf6 and a tris(3-sulphophenyl)-phosphine salt", J. Mol. Catalysis, vol. 50 (1989), pp. 291-302.
Rossetto et al., "Heterogeneous complexes of nickel MCM-41 with βdiimine ligands: Applications in olefin oligomerization", J. Catalysis, vol. 323 (2015), pp. 45-54.

(56) References Cited

OTHER PUBLICATIONS

Borba et al., "β-Diimine nickel complexes in BMI AICl4 ionic liquid: a catalytic biphasic system for propylene oligomerization", Applied Catalysis A, vol. 538 (2017), pp. 51-58.

Alt et al., "Catalytic Dimerization of Propene with Diiminophosphorane Nickel (II) Complexes in the Presence of Phosphine Additives", Jordan J. of Chemistry, vol. 3 (2008), pp. 367-379.

Poorters et a., "Synthesis and Properties of TRANSDIP, a Rigid Chelator Built upon a Cyclodextrin Cavity: Is TRANSDIP an Authentic trans-Spanning Ligand?", Chemistry—A European Journal, vol. 13 (2007), pp. 9448-9461.

Milinar et al., "The Effect of Noncatalytic Cations on the Activity and Selectivity of Nickel-Exchanged X Zeolites for Propene Oligomerization", ChemCatChem, vol. 5 (2013), pp. 3139-3147.

Axenov et al., "Bis(imino)cyclodiphosph(V)azane complexes of late transition metals: Efficient catalyst precursors for ethene and propene oligomerization and dimerization", J. of Catalysis, vol. 238 (2006), pp. 196-205.

Cai et al., "Customizing Polyolefin Morphology by Selective Pairing of Alkali Ions with Nickel Phenoxyimine-Polyethylene Glycol Catalysts", Organometallics, vol. 36 (2017), pp. 4691-4698.

Nyamoto et al., "Unsymmetrical (pyrazolylmethyl)pyridine metal complexes as catalysts for ethylene oligomerization reactions: Role of solvent and co-catalyst in product distribution", J. Mol. Catalysis A, vol. 394 (2014), pp. 274-282.

Zhang et al., "Synthesis of Branched Polyethylene Using (alpha-Diimine)Nickel(II)-TiCl4 Combined and Supported Catalyst", Chinese Journal of Polymer Science, vol. 22 (2004), pp. 313-319.

Deimund et al., "Nickel-Exchanged Zincosilicate Catalysts for the Oligomerization of Propylene", ACS Catalysis, vol. 4 (2014), pp. 4189-4195.

* cited by examiner

PROCESSES FOR POLYMERIZING INTERNAL OLEFINS AND COMPOSITIONS THEREOF

CROSS-REFERENCE TO RELATED APPLICATIONS

This application claims priority to U.S. Provisional Application Ser. No. 62/776,601 filed Dec. 7, 2018, which is herein incorporated by reference in its entirety.

FIELD

The present disclosure provides processes for polymerizing low molecular weight internal olefins. The present disclosure further provides polyolefin products useful as base stocks and or diesel fuel.

BACKGROUND

Base stock is a constituent in finished lubricants and the characteristics of the base stock contribute to the properties of the finished lubricants. Finished lubricants include engine oils, crankcase lubricants, and various industrial lubricants. Lubricants in commercial use today are prepared from a variety of natural and synthetic base stocks admixed with various additive packages and solvents depending upon their intended application. The base stocks typically include mineral oils, polyalphaolefins (PAO), gas-to-liquid base oils (GTL), silicone oils, phosphate esters, diesters, polyol esters, and the like.

Base stocks are categorized according to the American Petroleum Institute (API) classifications based on saturated hydrocarbon content, sulfur level, and viscosity index (see Table 1 infra). Typically, Group I, II, and III base stocks are each derived from crude oil via extensive processing, such as fractionating, solvent extraction, solvent dewaxing, and hydroisomerization. Group III base stocks can also be produced from synthetic hydrocarbon liquids obtained from natural gas, coal, or other fossil resources. Group IV base stocks are polyalphaolefins (PAOs), and are produced by the oligomerization of alpha olefins. Group V base stocks include all base stocks that do not belong to Groups I-IV, such as naphthenics, polyalkylene glycols (PAG), and esters.

Additionally, there are the informal categories of base stocks referred to as "Group II+" and "Group III+" that are generally recognized within the lubricant industry as corresponding to base stocks that exceed the minimum classification requirements of the formal group. For example, a "Group II+" base stock may have a viscosity index (VI) above 110 and a "Group III+" base stock may have a viscosity index (VI) between 130 and 150.

TABLE 1

| Property | API Classification | | | | |
| --- | --- | --- | --- | --- | --- |
| | Group I | Group II | Group III | Group IV | Group V |
| % Saturates | <90 | ≥90 | ≥90 | Polyalpha-olefins (PAOs) | All others not belonging to group I-IV |
| % Sulfur | >0.03 | ≤0.03 | ≤0.03 | | |
| Index (VI) | 80-120 | 80-120 | ≥120 | | |

Group IV PAOs, for example, can be synthesized by cationic oligomerization with a Lewis acid catalyst, such as $BF_3$, using 1-decene as feedstock followed by hydrogenation of the obtained oligomers. However, the products obtained by this process are branched, e.g. the products contain a high amount of tri-substitution as determined by $^1H$ NMR spectroscopy.

Furthermore, polymerization of $C_3$ and higher alpha-olefins can be performed using early transition metal catalysts (e.g., Ti/Zr/Hf/V). Internal olefins, on the other hand, have not been utilized as feed for base stock manufacturing due to their low reactivity and tendency to form highly branched products. In addition, small scale polymerization of internal olefins has been limited to formation of high molecular weight polymers. At the same time, lower molecular weight internal olefins are abundantly available from a variety of refining sources such as fluid catalytic cracking (FCC) gasoline and coker naphtha. For example, 10% of FCC products are C5 hydrocarbons, which is approximately 0.6 MBD in the United States, and approximately 27% of those are internal olefins. Due to their low reactivity, there are currently no significant uses of these olefins as feed to make higher molecular weight products. Therefore, upgrading these feeds into higher value products would be desirable. However, value upgrade options of the internal olefins are typically limited to alkane alkylation to gasoline and oligomerization to chemical intermediates, both promoted by acid catalysts.

There is a need for processes for polymerizing low molecular weight internal olefins that can provide novel linear base stocks having improved flow, low temperature properties, and thickening efficiency.

Furthermore, under present conditions, petroleum refineries are finding it increasingly necessary to seek the most cost-effective means of improving the quality of diesel fuel products. Cetane number is a measure of ignition quality of diesel fuels. Cetane number is highly dependent on the paraffinicity of molecular structures whether they be straight chain or alkyl attachments to rings. Distillate aromatic content, for example, is inversely proportional to cetane number while a high paraffinic content is directly proportional to a high cetane number.

In light of the ever present need for improving conventional diesel formation processes and for improving diesel fuel properties, there remains a need for a process of obtaining diesel fuel with high cetane number than can be formed from internal olefins.

SUMMARY

The present disclosure provides processes for polymerizing low molecular weight internal olefins. The present disclosure further provides base stocks having one or more of improved flow, low temperature properties, and thickening efficiency. The present disclosure further provides diesel fuels formed from the polymerization of internal olefins, the diesel fuels having improved low temperature properties and high cetane number.

In at least one embodiment, a process includes introducing a feedstream comprising at least 5 wt % $C_4$-$C_{30}$ internal-olefin content with a catalyst system that polymerizes such internal olefins, for example a catalyst system comprising a nickel diimine catalyst. The method includes obtaining a $C_6$-$C_{100}$ polyolefin product having one or more of a carbon fraction of epsilon-carbons of from about 0.08 to about 0.3, a carbon fraction of $CH_3$ (from methyl+ethyl) from about 0.02 to about 0.15, a carbon fraction of $CH_3$ (from propyl+butyl+longer carbon chains) from about 0.06 to about 0.2, and a carbon fraction of total $CH_3$ from about 0.1 to about 0.3, as determined by $^{13}C$ NMR spectroscopy, based on the total carbon content of the polyolefin product.

In at least one embodiment, a $C_6$-$C_{100}$ polyolefin product has one or more of a carbon fraction of epsilon-carbons of from about 0.08 to about 0.3, a carbon fraction of $CH_3$ from (methyl+ethyl) of from about 0.02 to about 0.15, a carbon fraction of $CH_3$ from (propyl+butyl+longer carbon chains) of from about 0.06 to about 0.2, and a carbon fraction of total $CH_3$ of from about 0.1 to about 0.3, as determined by $^{13}C$ NMR spectroscopy, based on the total carbon content of the polyolefin product. As used herein, "epsilon-carbon" refers to a long chain methylene carbons appearing in the 29-30 ppm region of a $^{13}C$ NMR spectrum using $CDCl_3$ solvent.

In at least one embodiment, a hydrogenated $C_6$-$C_{100}$ polyolefin product, such as a $C_{10}$-$C_{25}$ polyolefin, which has a cetane number of about 50 or greater.

DETAILED DESCRIPTION

Figure 1:
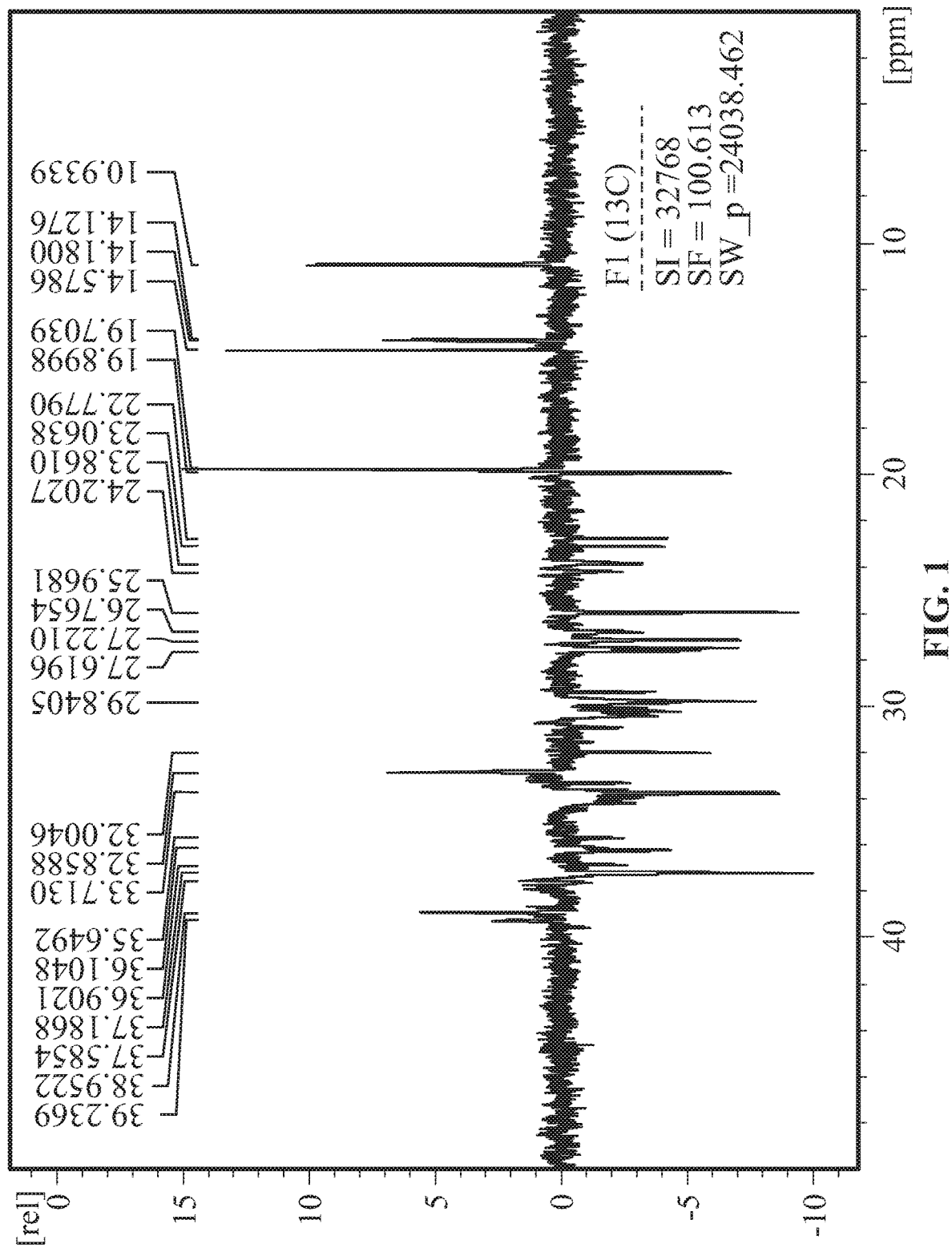
FIG. 1 is a $^{13}C$ DEPT-135 NMR spectrum of Example 4, according to one embodiment.

The present disclosure provides novel linear base stocks and processes for producing such base stocks by polymerizing low molecular weight internal olefins. The present disclosure further provides polyolefin products (e.g., linear base stocks) having one or more of improved flow, low temperature properties, and thickening efficiency. The present disclosure further provides novel diesel compositions and processes for producing such diesel compositions by polymerizing low molecular weight internal olefins. The present disclosure further provides polyolefin products (e.g., diesel compositions) having improved cetane number.

It has been discovered that a dual catalyst system containing a nickel diimine catalyst and a palladium diimine catalyst or a second nickel diimine catalyst (different than the first nickel diimine catalyst) can provide novel polyolefin products which are suitable as, for example, diesel fuels and/or base stocks. Without being bound by theory, it is believed that one of the catalysts provides isomerization of internal olefins from a relatively unreactive cis-conformation to a more reactive trans-conformation, which is a conformation capable of undergoing polymerization. Meanwhile, a second catalyst of the catalyst system is capable of polymerizing the trans-internal olefins to form the novel polyolefin products.

For example, the polyolefin products (e.g., base stocks) produced in accordance with processes of the present disclosure can have high linearity which can provide improved flow, low temperature properties, and thickening efficiency.

It has further been discovered that a catalyst system containing only the nickel diimine catalyst (in the absence of the palladium diimine catalyst) and optionally a second nickel diimine catalyst also provides novel polyolefin products having, for example, a high cetane number after hydrogenation, which are suitable as diesel fuels.

Furthermore, the ability to utilize the low activity internal olefins of conventional feeds while at the same time increasing the linearity of the products has the benefit of low feed cost and superior product performance.

In at least one embodiment, a base stock is a $C_6$-$C_{100}$ polyolefin product, such as a $C_{25}$-$C_{50}$ polyolefin product. In at least one embodiment, a base stock is a hydrogenated $C_6$-$C_{100}$ polyolefin product, such as a hydrogenated $C_{25}$-$C_{50}$ polyolefin product.

In at least one embodiment, a diesel fuel is a $C_6$-$C_{100}$ hydrogenated polyolefin product, such as a $C_6$-$C_{25}$ hydrogenated polyolefin product.

All numerical values within the detailed description and the claims herein are modified by "about" or "approximately" the indicated value, and take into account experimental error and variations that would be expected by a person of ordinary skill in the art.

As used herein, "carbon fraction" is a measure of the number of a particular kind of carbon atoms (e.g., that are epsilon-Carbon) divided by the total number of carbon atoms in a molecule (e.g., a polyolefin product).

A "polymer" has two or more of the same or different monomer ("mer") units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers.

As used herein, the term "base stock" means a hydrocarbon liquid useable as a major component of a lubricating oil. As used herein, the term "base oil" refers to a blend of base stocks useable as a major component of a lubricating oil. As used herein, the term "major component" means a component present in a lubricating oil in an amount of about 50 weight percent (wt. %) or greater. As used herein, the term "minor component" means a component (e.g., one or more lubricating oil additives) present in a lubricating oil in an amount less than about 50 wt. %.

As used herein, "kinematic viscosity at 100° C." may be used interchangeably with "KV100," and "kinematic viscosity at 40° C." may be used interchangeably with "KV40."

A "catalyst system" includes at least one catalyst compound and at least one activator. When "catalyst system" is used to describe such the catalyst compound/activator combination before activation, it means the unactivated catalyst complex (precatalyst) together with an activator. When it is used to describe the combination after activation, it means the activated complex and the activator. The catalyst compound may be neutral as in a precatalyst, or a charged species with a counter ion as in an activated catalyst system.

As used herein, "MMAO" is modified methyl alumoxane which contains some higher alkyl groups which can improve solubility in non-polar solvents. A useful MMAO is MMAO cocatalyst type 3A (commercially available from Akzo Chemicals, Inc. under the trade name Modified Methylalumoxane type 3A, described in U.S. Pat. No. 5,041,584).

For purposes of the present disclosure and claims thereto, the term "substituted" means that a hydrogen group has been replaced with a heteroatom, or a heteroatom containing group. For example, a "substituted hydrocarbyl" is a radical made of carbon and hydrogen where at least one hydrogen is replaced by a heteroatom or heteroatom containing group. The term "substituted" means that at least one hydrogen atom has been replaced with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*, —SiR*$_3$, —GeR*, —GeR*$_3$, —SnR*, —SnR*$_3$, —PbR*$_3$, and the like, where each R* is independently a hydrocarbyl or halocarbyl radical, and two or more R* may join together to form a substituted or unsubstituted saturated, partially unsaturated or aromatic cyclic or polycyclic ring structure, or where at least one heteroatom has been inserted within a hydrocarbyl ring.

The terms "hydrocarbyl radical," "hydrocarbyl," "hydrocarbyl group," "alkyl radical," and "alkyl" are used interchangeably. Likewise, the terms "group," "radical," and "substituent" are also used interchangeably. For purposes of this disclosure, "hydrocarbyl radical" is defined to be $C_1$-$C_{100}$ radicals, that may be linear, branched, or cyclic, and when cyclic, aromatic or non-aromatic. Examples of such radicals can include methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least one halogen (such as Br, $C_1$, F or I) or at least one functional group, such as —NR*$_2$, —OR*, —SeR*, —TeR*, —PR*$_2$, —AsR*$_2$, —SbR*$_2$, —SR*, —BR*$_2$, —SiR*$_3$, —GeR*, —GeR*$_3$, —SnR*, —SnR*$_3$, —PbR*$_3$, and the like, or where at least one heteroatom has been inserted within a hydrocarbyl ring.

The term "olefin" refers to an unsaturated hydrocarbon compound having a hydrocarbon chain containing at least one carbon-to-carbon double bond in the structure thereof, wherein the carbon-to-carbon double bond does not constitute a part of an aromatic ring. The olefin may be linear, branched linear, or cyclic.

The term "terminal olefin" refers to an olefin having a terminal carbon-to-carbon double bond in the structure thereof (($R^1R^2$)—C=$CH_2$, where $R^1$ and $R^2$ can be independently hydrogen or any hydrocarbyl group, such as $R^1$ is hydrogen, and $R^2$ is an alkyl group). A "linear terminal olefin" is a terminal olefin defined in this paragraph wherein $R^1$ is hydrogen, and $R^2$ is hydrogen or a linear alkyl group.

The term "internal olefin" includes olefins that are vinylenes.

The term "vinyl" means an olefin having the following formula:

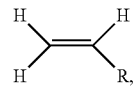

wherein R is a hydrocarbyl group, such as a saturated hydrocarbyl group.

The term "vinylidene" means an olefin having the following formula:

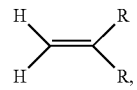

wherein each instance of R is independently a hydrocarbyl group, such as a saturated hydrocarbyl group.

The term "vinylene" or "1,2-di-substituted vinylene" means (i) an olefin having the following formula (which is a "cis-" conformation):

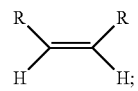

or (ii) an olefin having the following formula (which is a "trans-" conformation):

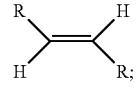

or (iii) a mixture of (i) and (ii) at any proportion thereof, wherein each instance of R is independently a hydrocarbyl group, such as saturated hydrocarbyl group.

The term "tri-substituted vinylene" means an olefin having the following formula:

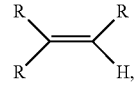

wherein each instance of R is independently a hydrocarbyl group, such as a saturated hydrocarbyl group.

The term "tetra-substituted vinylene" means an olefin having the following formula:

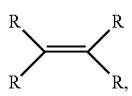

wherein each instance of R is independently a hydrocarbyl group, such as a saturated hydrocarbyl group.

Internal Olefins

An internal olefin (e.g., monomers) of the present disclosure can be a linear $C_4$-$C_{30}$ olefin having one or more carbon-carbon double bonds along the olefin backbone (also referred to as "internal unsaturation") instead of, or in addition to, a carbon-carbon double bond at a terminus of the olefin (also referred to as "terminal unsaturation"). Linear $C_4$-$C_{30}$ internal olefins may be referred to as $C_4$-$C_{30}$ internal-olefins. In addition to internal unsaturations, a $C_4$-$C_{30}$ internal olefin may additionally have one or more terminal unsaturations. An internal olefin can have one or more cis-conformations or one or more trans-conformations.

In at least one embodiment, an internal olefin is selected from a cis-configuration, trans-configuration, or mixture thereof of one or more of 2-butene, 2-pentene, 2-hexene, 3-hexene, 2-heptene, 3-heptene, 2-octene, 3-octene, 4-octene, 2-nonene, 3-nonene, 4-nonene, 2-decene, 3-decene, 4-decene, and 5-decene.

Internal olefins of the present disclosure can be obtained from commercial sources (such as Sigma Aldrich or TCI) and/or may be obtained from refined hydrocarbon feeds such as fluid catalytic cracking (FCC) gasoline or coker naphtha. For example, a cellulosic feed material may be liquefactioned to form a product that then undergoes a fluid catalytic cracking process, as described in U.S. Pub. No. 2013/0118059. Any suitable cellulose-containing material may be used as a cellulosic material of the present disclosure. The cellulosic material for use according to the present disclosure may be obtained from a variety of plants and plant materials including agricultural wastes, forestry wastes, sugar processing residues and/or mixtures thereof. Examples of suitable cellulose-containing materials include agricultural wastes such as corn stover, soybean stover, corn cobs, rice straw, rice hulls, oat hulls, corn fibre, cereal straws such as wheat, barley, rye and oat straw; grasses; forestry products such as wood and wood-related materials such as sawdust; waste paper; sugar processing residues such as bagasse and beet pulp; or mixtures thereof.

Alternatively, a biomass material may be treated under high temperature at a short contact time to form a fast pyrolysis oil that can then undergo a fluid catalytic cracking process, such as the processes described in U.S. Pat. No. 9,120,989. Suitable biomass materials include wood, wood residues, sawdust, slash bark, thinnings, forest cullings, begasse, corn fiber, corn stover, empty fruit bunches (EFB), fronds, palm fronds, flax, straw, low-ash straw, energy crops, palm oil, non-food-based biomass materials, crop residue, slash, pre-commercial thinnings and tree residue, annual covercrops, switchgrass, *miscanthus*, cellulosic containing components, cellulosic components of separated yard waste, cellulosic components of separated food waste, cellulosic components of separated municipal solid waste (MSW), or combinations thereof.

According to various embodiments, the internal-olefin is from a refinery stream. According to various embodiments, the internal-olefin is in a dilute olefin stream.

Polymerization Processes

Polymerization processes of the present disclosure include the polymerization of $C_4$-$C_{30}$ internal-olefins to provide a polyolefin product. A process involves contacting a $C_4$-$C_{30}$ internal-olefin feed with a catalyst system comprising a nickel diimine catalyst. The catalyst system can include a nickel diimine catalyst and may optionally further include a palladium diimine catalyst or a second nickel diimine catalyst (having a chemical structure different than the first nickel diimine catalyst). Polyolefin products of the present disclosure can be linear $C_6$-$C_{100}$ polyolefin products, such as $C_{10}$-$C_{25}$ polyolefin products.

In a polymerization process, a feed stream comprising internal olefins, such as a feed stream comprising at least 5 wt % of internal olefins, is contacted with a catalyst optionally in the presence of a solvent. The catalyst(s) may be activated by any suitable activator, such as an alkyl alumoxane. In at least one embodiment, an alkyl alumoxane is methyl alumoxane or modified methyl alumoxane. The solvent may be a saturated hydrocarbon or an aromatic solvent such as n-hexane, n-heptane, cyclohexane, benzene, toluene, xylenes, or a mixture thereof. In at least one embodiment, the feed stream is contacted with the catalyst in the absence of (e.g. substantially free of) a solvent. Contacting the catalyst with a feedstream comprising the internal olefins may be carried out in an atmosphere inert under the process conductions, such as in nitrogen, argon, or a mixture thereof. According to various embodiments, the feedstream or feed comprising the internal olefins is or is from a refinery stream. According to various embodiments, the feed comprising the internal olefins is a dilute olefin stream.

A molar ratio of aluminum to nickel (representative of alkyl alumoxane to nickel catalyst) can be from about 10:1 to about 1000:1, such as from about 100:1 to about 700:1, such as from about 200:1 to about 500:1. For dual catalyst systems where a palladium diimine catalyst or a second nickel diimine catalyst is used, a molar ratio of aluminum to metal of the second catalyst (representative of alkyl alumoxane to second catalyst) can be from about 10:1 to about 1000:1, such as from about 100:1 to about 700:1, such as from about 200:1 to about 500:1.

Also for dual catalyst systems where a second diimine catalyst is used, a molar ratio of nickel diimine catalyst to second diimine catalyst is from about 0.1:1 to about 1:0.1, such as from about 0.5:1 to about 1:0.5, such as about 1:1.

A catalyst loading % (based on the concentration of monomer) can be from about 0.1 mol % to about 5 mol %, such as from about 0.1 mol % to about 2 mol %, such as from about 0.1 mol % to about 0.5 mol %, for example about 0.2 mol %.

In at least one embodiment, a polymerization is performed at a temperature of 120° C. or less, such as from −30° C. to 100° C., such as from −25° C. to 25° C., such as about 0° C. A polymerization of the present disclosure may be carried out by mixing a solution of internal-olefin and the catalyst(s), cooling the solution, adding activator to the cooled solution, and optionally allowing the mixture to increase in temperature. A polymerization can be performed at ambient pressure for a period of time, such as from about 1 minute to about 240 hours, such as from about 5 minutes to about 48 hours, such as from about 30 minutes to about 24 hours, alternatively from about 4 hours to about 48 hours, alternatively from about 1 minute to about 1 hour, such as about 1 minute to about 30 minutes, such as about 5 minutes to about 15 minutes.

A polymerization can be terminated, for example, by addition of an acid solution, such as 3% HCl-MeOH, which promotes precipitation of polyolefin products from the solvent mixture. The polyolefin products obtained can be washed with a solvent, such as methanol, and dried under vacuum at a temperature of, for example, from about room temperature to about 100° C., such as about 60° C.

Polymerization Catalysts

Polymerization catalysts of the present disclosure include a nickel diimine catalyst alone or in combination with a second diimine catalyst (that can be a palladium diimine catalyst or a nickel diimine catalyst different than the first nickel diimine catalyst) to provide polyolefin products formed from internal olefins. Without being bound by theory, it is believed that one of the catalysts, such as a palladium diimine or a nickel diimine (such as (NN-Ph)NiBr$_2$), provides isomerization of internal olefins from a relatively unreactive cis-conformation to a more reactive trans-conformation (e.g., a conformation capable of undergoing polymerization). Meanwhile, a second catalyst, such as a nickel diimine catalyst (such as (NN-Ph-iPr)NiBr$_2$), of the catalyst system is capable of polymerizing the trans-internal olefins to form the novel polyolefin products.

It has been discovered that nickel diimine catalysts and palladium diimine catalysts that are monosubstituted in one of the ortho-positions of one or both of the aryl-imine moieties provides low molecular weight polymers.

It has further been discovered that a catalyst system containing only a nickel diimine catalyst (such as (NN-Ph)NiBr$_2$ or (NN-Ph-iPr)NiBr$_2$) (in the absence of the palladium diimine catalyst or a second nickel diimine catalyst) also provides novel polyolefin products having, for example, a high cetane number after hydrogenation which are suitable as diesel fuels.

Nickel diimines are advantageous internal olefin polymerization catalysts as they are typically not inhibited during a polymerization process by the presence of alkanes, the presence of an aromatic solvent, or the presence of branched/tri-substituted olefins. Nickel diimines may also polymerize alpha-olefins present in an internal olefin feed (such as an internal olefin that also has terminal unsaturation). In comparison, early transition metal catalysts used to polymerize olefins are only compatible with alpha-olefins and are incompatible in the presence of internal olefins. In addition, acid catalyzed polymerization produces branched products that do not have high cetane numbers after hydrogenation.

In at least one embodiment, a nickel diimine catalyst is represented by Formula (I):

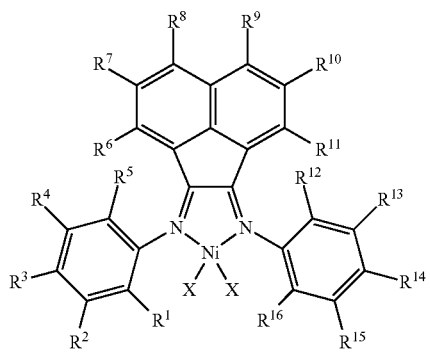

(I)

where:
each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ is independently selected from hydrogen, $C_1$-$C_{40}$ hydrocarbyl, $C_1$-$C_{40}$ substituted hydrocarbyl, or a halogen, and each X is independently selected from $C_1$-$C_{20}$ hydrocarbyl, $C_1$-$C_{20}$ substituted hydrocarbyl, or a halogen. In at least one embodiment, each X is bromine.

In at least one embodiment, the nickel diimine catalyst represented by Formula (I) is monosubstituted in the ortho-position of one or both of the aryl imide moieties. For example, each of $R^5$ and $R^{12}$ is hydrogen and each of each of $R^1$ and $R^{16}$ is independently selected from $C_1$-$C_{40}$ hydrocarbyl, $C_1$-$C_{40}$ substituted hydrocarbyl, or a halogen.

In at least one embodiment, each of $R^2$, $R^3$, $R^4$, $R^6$, $R^7$, $R^8$, $R^9$, $R^{10}$, $R^{11}$, $R^{13}$, $R^{14}$, and $R^{15}$ is hydrogen and each of $R^1$, $R^5$, $R^{12}$, and $R^{16}$ is independently hydrogen, $C_1$-$C_{40}$ hydrocarbyl, $C_1$-$C_{40}$ substituted hydrocarbyl, or a halogen. For example, each of $R^2$, $R^3$, $R^4$, $R^6$, $R^7$, $R^8$, $R^9$, $R^{10}$, $R^{11}$, $R^{13}$, $R^{14}$, and $R^{15}$ is hydrogen and each of $R^1$, $R^5$, $R^{12}$, and $R^{16}$ is independently selected from hydrogen, methyl, isopropyl, or fluorine. In at least one embodiment, each of $R^2$, $R^3$, $R^4$, $R^6$, $R^7$, $R^8$, $R^9$, $R^{10}$, $R^{11}$, $R^{13}$, $R^{14}$, and $R^{15}$ is hydrogen and each of $R^1$, $R^5$, $R^{12}$, and $R^{16}$ is also hydrogen. Alternatively, each of $R^2$, $R^3$, $R^4$, $R^6$, $R^7$, $R^8$, $R^9$, $R^{10}$, $R^{11}$, $R^{13}$, $R^{14}$, and $R^{15}$ is hydrogen and each of $R^1$, $R^5$, $R^{12}$, and $R^{16}$ is methyl. Alternatively, each of $R^2$, $R^3$, $R^4$, $R^6$, $R^7$, $R^8$, $R^9$, $R^{10}$, $R^{11}$, $R^{13}$, $R^{14}$, and $R^{15}$ is hydrogen and each of $R^1$, $R^5$, $R^{12}$, and $R^{16}$ is isopropyl. Alternatively, each of $R^2$, $R^3$, $R^4$, $R^6$, $R^7$, $R^8$, $R^9$, $R^{10}$, $R^{11}$, $R^{13}$, $R^{14}$, and $R^{15}$ is hydrogen and each of $R^1$, $R^5$, $R^{12}$, and $R^{16}$ is fluorine. Alternatively, each of $R^2$, $R^3$, $R^4$, $R^6$, $R^7$, $R^8$, $R^9$, $R^{10}$, $R^{11}$, $R^{13}$, $R^{14}$, and $R^{15}$ is hydrogen, each of $R^1$ and $R^{16}$ is isopropyl, and each of $R^5$ and $R^{12}$ is hydrogen.

In at least one embodiment, each of $R^1$, $R^5$, $R^{12}$, and $R^{16}$ is hydrogen. Without being bound by theory, it is believed that hydrogen at $R^1$, $R^5$, $R^{12}$, and $R^{16}$ promotes isomerization of internal olefins from a cis-configuration to a trans-configuration.

Like nickel diimine catalysts, palladium diimine catalysts are advantageous as they are typically not inhibited during a polymerization process by the presence of alkanes, the presence of an aromatic solvent, or the presence of branched/tri-substituted olefins. Without being bound by theory, it is believed that a palladium diimine catalyst isomerizes cis-internal olefins into the more reactive trans-internal olefins.

In at least one embodiment, a palladium diimine catalyst is represented by Formula (II):

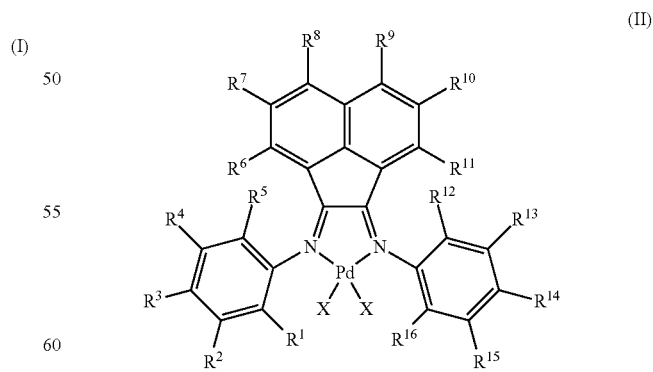

(II)

where:
each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ is independently selected from hydrogen, $C_1$-$C_{40}$ hydrocarbyl, $C_1$-$C_{40}$ substituted hydrocarbyl, or a halogen, and each X is independently selected from $C_1$-$C_{20}$ hydrocarbyl, $C_1$-$C_{20}$ substituted hydrocarbyl, or a halogen. In at least one embodiment, each X is bromine.

In at least one embodiment, the palladium diimine catalyst represented by Formula (II) is monosubstituted in the ortho-position of one or both of the aryl imide moieties. For example, each of $R^5$ and $R^{12}$ is hydrogen and each of each of $R^1$ and $R^{16}$ is independently selected from $C_1$-$C_{40}$ hydrocarbyl, $C_1$-$C_{40}$ substituted hydrocarbyl, or a halogen.

In at least one embodiment, each of $R^2$, $R^3$, $R^4$, $R^6$, $R^7$, $R^8$, $R^9$, $R^{10}$, $R^{11}$, $R^{13}$, $R^{14}$, and $R^{15}$ is hydrogen and each of $R^1$, $R^5$, $R^{12}$, and $R^{16}$ is independently hydrogen, $C_1$-$C_{40}$ hydrocarbyl, $C_1$-$C_{40}$ substituted hydrocarbyl, or a halogen. For example, each of $R^2$, $R^3$, $R^4$, $R^6$, $R^7$, $R^8$, $R^9$, $R^{10}$, $R^{11}$, $R^{13}$, $R^{14}$, and $R^{15}$ is hydrogen and each of $R^1$, $R^5$, $R^{12}$, and $R^{16}$ is independently selected from hydrogen, methyl, isopropyl, or fluorine. In at least one embodiment, each of $R^2$, $R^3$, $R^4$, $R^6$, $R^7$, $R^8$, $R^9$, $R^{10}$, $R^{11}$, $R^{13}$, $R^{14}$, and $R^{15}$ is hydrogen and each of $R^1$, $R^5$, $R^{12}$, and $R^{16}$ is also hydrogen. Alternatively, each of $R^2$, $R^3$, $R^4$, $R^6$, $R^7$, $R^8$, $R^9$, $R^{10}$, $R^{11}$, $R^{13}$, $R^{14}$, and $R^{15}$ is hydrogen and each of $R^1$, $R^5$, $R^{12}$, and $R^{16}$ is methyl. Alternatively, each of $R^2$, $R^3$, $R^4$, $R^6$, $R^7$, $R^8$, $R^9$, $R^{10}$, $R^{11}$, $R^{13}$, $R^{14}$, and $R^{15}$ is hydrogen and each of $R^1$, $R^5$, $R^{12}$, and $R^{16}$ is isopropyl. Alternatively, each of $R^2$, $R^3$, $R^4$, $R^6$, $R^7$, $R^8$, $R^9$, $R^{10}$, $R^{11}$, $R^{13}$, $R^{14}$, and $R^{15}$ is hydrogen and each of $R^1$, $R^5$, $R^{12}$, and $R^{16}$ is fluorine. Alternatively, each of $R^2$, $R^3$, $R^4$, $R^6$, $R^7$, $R^8$, $R^9$, $R^{10}$, $R^{11}$, $R^{13}$, $R^{14}$, and $R^{15}$ is hydrogen, each of $R^1$ and $R^{16}$ is isopropyl, and each of $R^5$ and $R^{12}$ is hydrogen.

Synthesis of Polymerization Catalysts

Catalyst compounds of the present disclosure can be prepared according to any suitable method. Scheme 1 illustrates an exemplary preparation of nickel diimine and palladium diimine catalysts. As shown in Scheme 1, an acenaphthylene-1,2-dione aniline(s) is treated with aniline(s) and a catalytic amount of formic acid in methanol under elevated temperature to form a diimine product. An elevated temperature can be from about 30° C. to about 80° C., such as about 45° C. $R^1$ through $R^{16}$ are as described above for the catalyst compounds represented by Formula (I) or Formula (II).

The diimine product is treated with (DME)$MX_2$ in a dichloromethane solvent to form a catalyst compound represented by Formula (I) or Formula (II) as described above. DME is 1, 2-dimethoxyethane, M is nickel or palladium, and X is as described above for the catalyst compounds represented by Formula (I) or Formula (II).

Polyolefin Products

Polyolefin products produced in accordance with processes of the present disclosure can be base stocks that possess (e.g., before or after hydrogenation) high linearity which can provide improved flow, low temperature properties, and thickening efficiency. Alternatively, polyolefin products produced in accordance with processes of the present disclosure can be diesel fuels that have a high cetane number (e.g., after hydrogenation).

A polyolefin product of the present disclosure can be a $C_6$-$C_{100}$ polyolefin product, such as a $C_8$-$C_{50}$ polyolefin product, such as a $C_{10}$-$C_{40}$ polyolefin product, such as a $C_{12}$-$C_{25}$ polyolefin product.

Scheme 1

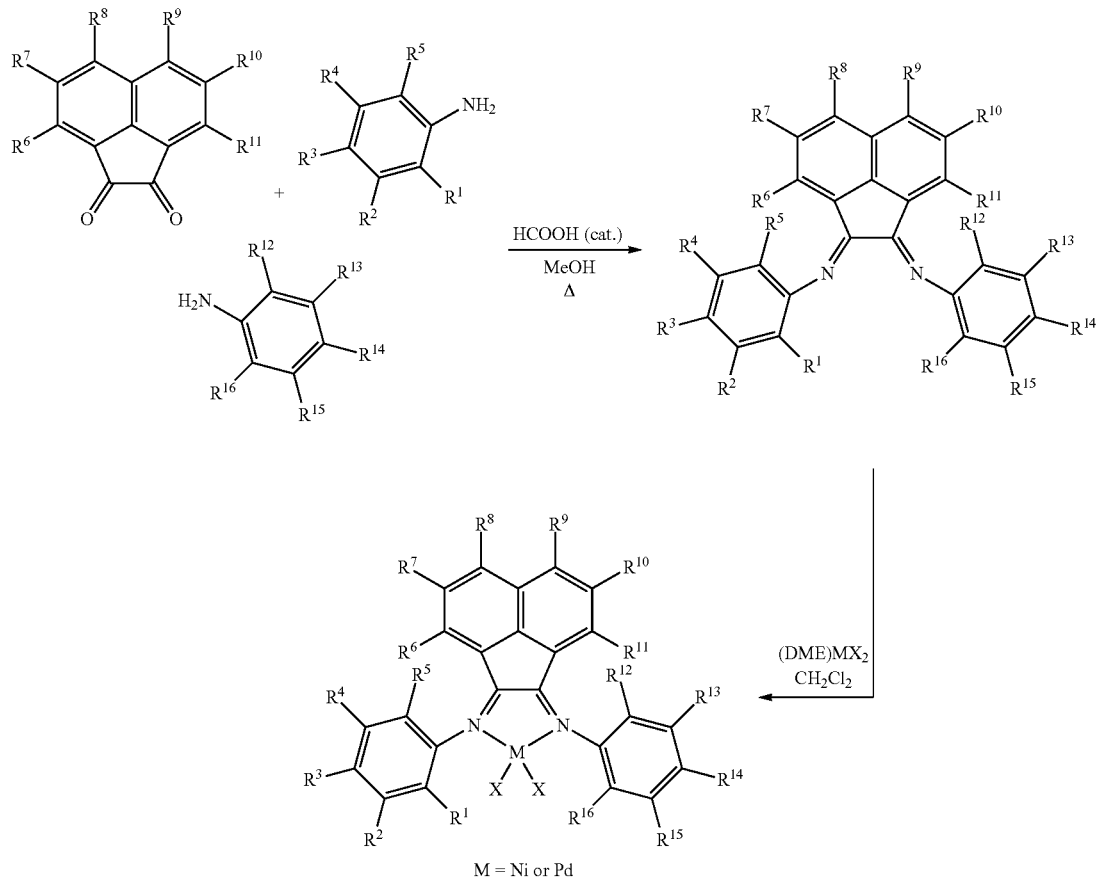

M = Ni or Pd

The branching structures of the polyolefin products can be determined by $^{13}$C NMR spectroscopy (which can include Distortionless Enhancement by Polarization Transfer at 135 degree pulse flip angle, known as "DEPT135" spectroscopy). $^{13}$C NMR spectroscopy differentiates the types of carbon in the polyolefin product sample (e.g., $CH_3$, $CH_2$, CH, and quaternary C). For example, epsilon-carbons (e-$CH_2$) have chemical shifts (in $CDCl_3$ solvent) of approx. 28.5 ppm to 31.5 ppm; isolated methyls ($CH_3$) have chemical shifts (in $CDCl_3$ solvent) of approx. 20 ppm; methyls ($CH_3$) of propyl, butyl, and longer linear carbon chains have chemical shifts (in $CDCl_3$ solvent) of approx. 14 ppm to 15 ppm; and methyl ($CH_3$) of ethyl side chains have chemical shifts (in $CDCl_3$ solvent) of approx. 12 ppm.

In at least one embodiment, a polyolefin product of the present disclosure has a carbon fraction of epsilon-carbons of from about 0.08 to about 0.3, such as from about 0.1 to about 0.25, such as from about 0.13 to about 0.24, as determined by $^{13}$C NMR spectroscopy, based on the total carbon content (1.0) of the polyolefin product. Additionally or alternatively, a polyolefin product of the present disclosure can have a carbon fraction of $CH_3$ from (methyl+ethyl) of from about 0.02 to about 0.15, such as from about 0.05 to about 0.12, as determined by $^{13}$C NMR spectroscopy, based on the total carbon content (1.0) of the polyolefin product. Additionally or alternatively, a polyolefin product of the present disclosure can have a carbon fraction of $CH_3$ from (propyl+butyl+longer carbon chains) of from about 0.06 to about 0.2, such as from about 0.08 to about 0.13, as determined by $^{13}$C NMR spectroscopy, based on the total carbon content (1.0) of the polyolefin product. Additionally or alternatively, a polyolefin product of the present disclosure can have a carbon fraction of total $CH_3$ of from about 0.1 to about 0.3, such as from about 0.13 to about 0.21, as determined by $^{13}$C NMR spectroscopy, based on the total carbon content (1.0) of the polyolefin product.

The various types of carbon atoms of a polyolefin product of the present disclosure can be determined using $^{1}$H NMR spectroscopy. For example, di-substituted olefin content and tri-substituted olefin content are indicators of linearity of a polyolefin product. A high amount of di-substituted olefin content indicates high linearity, and a low amount of tri-substituted olefin content indicates high linearity. A polyolefin product of the present disclosure can have a di-substituted olefin content of greater than 30%, based on total unsaturations of the polyolefin product. In at least one embodiment, a polyolefin product has a di-substituted olefin content of from about 30% to about 80%, such as from about 50% to about 75%, such as from about 60% to about 70%, based on total unsaturations of the polyolefin product. A polyolefin product of the present disclosure can have a tri-substituted olefin content of less than 50%, based on total unsaturations of the polyolefin product. In at least one embodiment, a polyolefin product has a tri-substituted olefin content of from about 1% to about 50%, such as from about 5% to about 40%, such as from about 20% to about 40%, based on total unsaturations of the polyolefin product. The high linearity of polyolefin products of the present disclosure provides improved flow properties, as compared to highly branched polyolefin products.

In addition, polyolefin products of the present disclosure can have high vinyl and/or vinylidene content. For example, a polyolefin product can have a vinyl content of from about 0.5% to about 10%, such as from about 0.8% to about 5%, such as from about 1% to about 4%, based on total unsaturations of the polyolefin product. Additionally or alternatively, a polyolefin product can have a vinylidene content of from about 0.1% to about 10%, such as from about 0.3% to about 5%, such as from about 0.5% to about 3%, based on total unsaturations of the polyolefin product. The high amounts of di-substituted olefins, vinylidenes, and alpha olefins are more reactive than tri-substituted olefins which provide improved subsequent reactivity of the polyolefin products, such as faster hydrogenation processes.

Base Stocks

In at least one embodiment, a base stock is a $C_6$-$C_{100}$ polyolefin product, such as a $C_{25}$-$C_{50}$ polyolefin product.

A polyolefin product of the present disclosure, when added to an oil (as a viscosity modifier) or used as an oil, can reduce the tendency of the oil to change its viscosity with temperature in order to improve its viscosity index (VI) and flow characteristics. Improving VI helps in maintaining constant the flow properties of the protective oil film. This means a high enough viscosity to avoid damage on engine parts when the temperature rises because of the engine heat and a low enough viscosity against the cold start and pumping. Polyolefin products of the present disclosure can have a VI of about 120 or greater, such as about 140 or greater, such as about 150 or greater, such as about 170 or greater, such as about 180 or greater, as determined according to ASTM D2270.

In addition, base stocks are affected by many properties including kinematic viscosity (KV), where an inverse relationship exists between KV and low-temperature fluidity, and VI, where a direct relationship exists between VI and low-temperature fluidity. Increasing the VI of a base stock by adding a polymer product of the present disclosure can provide improved viscometrics under both low-temperature and high-temperature regimes. VI itself represents the change in viscosity over a temperature range from 40° C. to 100° C. The higher the VI, the lower the oil's viscometric properties will change, and the flatter its profile will be over the temperature range. This can be extended to higher and lower temperatures. In at least one embodiment, a polyolefin product of the present disclosure can have a kinematic viscosity at 100° C. (KV100), as determined by ASTM D445, of about 20 cSt to about 200 cSt, such as from about 40 cSt to about 120 cSt, such as from about 50 cSt to about 100 cSt. Additionally or alternatively, a polyolefin product of the present disclosure can have a kinematic viscosity at 40° C. (KV40), as determined by ASTM D445, of about 150 cSt to about 2,000 cSt, such as from about 350 cSt to about 1,400 cSt, such as from about 470 cSt to about 1,100 cSt.

In addition, glass transition temperature (Tg) is indicative of the fluidity of a material at low temperature operations. Tg can be measured using Differential Scanning calorimetry (DSC) on a commercially available instrument (e.g., TA Instruments 2920 DSC). Tg is measured by equilibrating the sample at 100.00° C., isothermal for 5.00 min, ramping the temperature at 10.00° C./min to −100.00° C., isothermal for 5.00 min, ramping the temperature at 10.00° C./min to 100.00° C., and isothermal for 2.00 min.

A polyolefin product of the present disclosure can have a glass transition temperature (Tg) of from about −110° C. to about −50° C., such as from about −95° C. to about −75° C., such as from about −95° C. to about −85° C.

Hydrogenation of Polyolefin Products

A polyolefin product formed by a polymerization process can be catalytically hydrogenated to form a hydrogenated polyolefin product. A hydrogenated polyolefin product can be used as a lubricating oil base stock. The hydrogenation may be carried out in solution. The catalyst may be any suitable hydrogenation catalyst, such as a palladium catalyst supported on activated carbon or a Raney nickel catalyst.

The hydrogenation can be carried out at elevated pressure, e.g., from 2,000 KPa to 10,000 KPa, such as from 4,500 KPa to 8,000 KPa. The hydrogenation reaction can be carried out at a temperature of from 15° C. to 200° C., such as from 30° C. to 70° C. The duration of the hydrogenation reaction may be from a few minutes to several days. After the hydrogenation reaction is complete, the reaction mixture can be cooled, depressurized and the solvent removed by vacuum distillation. The purity of the hydrogenated product can be determined by $^1$H NMR by detecting the disappearance of olefinic protons.

In at least one embodiment, a hydrogenation is performed using Ni/Kiselguhr as the catalyst, 1-5 mol %, under 200-400 psi of hydrogen at a temperature of from about 150° C. to about 200° C. for about 4 hours.

Hydrogenated Polyolefin Products

Hydrogenated polyolefin products, as base stocks, produced in accordance with processes of the present disclosure can possess high linearity which can provide improved flow, low temperature properties, and thickening efficiency. Alternatively, some hydrogenated polyolefin products can be used as diesel fuels having a high cetane number.

Hydrogenated Base Stocks

In at least one embodiment, a hydrogenated base stock is a $C_6$-$C_{100}$ hydrogenated polyolefin product, such as a $C_6$-$C_{50}$ hydrogenated polyolefin product, such as a $C_{25}$-$C_{50}$ hydrogenated polyolefin product.

The high linearity of hydrogenated polyolefin products of the present disclosure provides improved flow properties, as compared to highly branched polyolefin products. In addition, low amounts of methyl (—$CH_3$) and methane (CH) are also indicative of high linearity of a hydrogenated polyolefin product.

In at least one embodiment, a hydrogenated polyolefin product of the present disclosure has a carbon fraction of epsilon-carbons of from about 0.08 to about 0.3, such as from about 0.1 to about 0.25, such as from about 0.13 to about 0.24, as determined by $^{13}$C NMR spectroscopy, based on the total carbon content (1.0) of the hydrogenated polyolefin product. Additionally or alternatively, a hydrogenated polyolefin product of the present disclosure can have a carbon fraction of $CH_3$ from (methyl+ethyl) of from about 0.02 to about 0.15, such as from about 0.05 to about 0.12, as determined by $^{13}$C NMR spectroscopy, based on the total carbon content (1.0) of the hydrogenated polyolefin product. Additionally or alternatively, a hydrogenated polyolefin product of the present disclosure can have a carbon fraction of $CH_3$ from (propyl+butyl+longer carbon chains) of from about 0.06 to about 0.2, such as from about 0.08 to about 0.13, as determined by $^{13}$C NMR spectroscopy, based on the total carbon content (1.0) of the hydrogenated polyolefin product. Additionally or alternatively, a hydrogenated polyolefin product of the present disclosure can have a carbon fraction of total $CH_3$ of from about 0.1 to about 0.3, such as from about 0.13 to about 0.21, as determined by $^{13}$C NMR spectroscopy, based on the total carbon content (1.0) of the hydrogenated polyolefin product.

Lubricating Oils

Polyolefin products or hydrogenated polyolefin products of the present disclosure can be used as base stocks useful in engine oils. The polyolefin products and/or hydrogenated polyolefin products can be in the lube oil boiling range, typically from about 100° C. to about 450° C.

The viscosity-temperature relationship of a lubricating oil is an aspect often considered when selecting a lubricant for a particular application. Viscosity index (VI) is an empirical, unitless number which indicates the rate of change in the viscosity of an oil within a given temperature range. Fluids exhibiting a relatively large change in viscosity with temperature are said to have a low viscosity index. A low VI oil, for example, will thin out at elevated temperatures faster than a high VI oil. Usually, the high VI oil is more desirable because it has higher viscosity at higher temperature, which translated into thicker lubrication film and better protection of the contacting machine elements.

In another aspect, as the oil operating temperature decreases, the viscosity of a high VI oil will not increase as much as the viscosity of a low VI oil. This is advantageous because the excessive high viscosity of the low VI oil will decrease the efficiency of the operating machine. Thus high VI (HVI) oil has performance advantages in both high and low temperature operation. VI is determined according to ASTM method D 2270. A lubricating oil of the present disclosure can have a VI of about 120 or greater, such as about 140 or greater, such as about 150 or greater, such as about 170 or greater, such as about 180 or greater, as determined according to ASTM D2270.

VI is related to kinematic viscosities measured at 40° C. and 100° C. using ASTM method D 445. A lubricating oil of the present disclosure can have a kinematic viscosity at 100° C. (KV100), as determined by ASTM D445, of about 2 cSt to about 25 cSt, such as from about 3 cSt to about 18 cSt, such as from about 4 cSt to about 10 cSt. Additionally or alternatively, a lubricating oil of the present disclosure can have a kinematic viscosity at 40° C. (KV40), as determined by ASTM D445, of about 10 cSt to about 125 cSt, such as from about 20 cSt to about 50 cSt.

Polyolefin products or hydrogenated polyolefin products of the present disclosure can be present in a lubricating oil in an amount of from about 1 wt % to about 99 wt %, such as from about 1 wt % to about 50 wt %, such as from about 1 wt % to about 25 wt %, such as from about 5 wt % to about 10 wt %, based on the weight of the lubricating oil.

Other Lubricating Oil Additives

A lubricating oil of the present disclosure may additionally contain one or more lubricating oil performance additives including but not limited to dispersants, other detergents, corrosion inhibitors, rust inhibitors, metal deactivators, other anti-wear agents and/or extreme pressure additives, anti-seizure agents, wax modifiers, viscosity index improvers, viscosity modifiers, fluid-loss additives, seal compatibility agents, other friction modifiers, lubricity agents, anti-staining agents, chromophoric agents, defoamants, demulsifiers, emulsifiers, densifiers, wetting agents, gelling agents, tackiness agents, colorants, and others. For a review of many commonly used additives, see Klamann in Lubricants and Related Products, Verlag Chemie, Deerfield Beach, Fla.; ISBN 0-89573-177-0. Reference is also made to "Lubricant Additives Chemistry and Applications" edited by Leslie R. Rudnick, Marcel Dekker, Inc. New York, 2003 ISBN: 0-8247-0857-1.

Viscosity Improvers

Viscosity improvers (also known as Viscosity Index modifiers, and VI improvers) increase the viscosity of the oil composition at elevated temperatures which increases film thickness, while having limited effect on viscosity at low temperatures.

Suitable viscosity improvers include high molecular weight hydrocarbons, polyesters and viscosity index improver dispersants that function as both a viscosity index improver and a dispersant. Typical molecular weights of these polymers are from about 10,000 to about 1,000,000, such as about 20,000 to about 500,000, such as about 50,000 to about 200,000.

Examples of suitable viscosity improvers are polymers and copolymers of methacrylate, butadiene, olefins, or alkylated styrenes. Polyisobutylene is a commonly used viscosity index improver. Another suitable viscosity index improver is polymethacrylate (copolymers of various chain length alkyl methacrylates, for example), some formulations of which also serve as pour point depressants. Other suitable viscosity index improvers include copolymers of ethylene and propylene, hydrogenated block copolymers of styrene and isoprene, and polyacrylates (copolymers of various chain length acrylates, for example). Specific examples include styrene-isoprene or styrene-butadiene based polymers having a molecular weight of from about 50,000 to about 200,000.

The amount of viscosity modifier in a lubricating oil of the present disclosure may range from zero to about 8 wt %, such as about 0.1 wt % to about 4 wt %, such as about 0.1 wt % to about 2 wt % based on the weight of the lubricating oil.

Antioxidants

Typical anti-oxidants include phenolic anti-oxidants, aminic anti-oxidants and oil-soluble copper complexes.

The phenolic antioxidants include sulfurized and non-sulfurized phenolic antioxidants. The terms "phenolic type" or "phenolic antioxidant" used herein includes compounds having one or more than one hydroxyl group bound to an aromatic ring which may itself be mononuclear, e.g., benzyl, or poly-nuclear, e.g., naphthyl and spiro aromatic compounds. Thus "phenol type" includes phenol per se, catechol, resorcinol, hydroquinone, naphthol, etc., as well as alkyl or alkenyl and sulfurized alkyl or alkenyl derivatives thereof, and bisphenol type compounds including such biphenol compounds linked by alkylene bridges sulfuric bridges or oxygen bridges. Alkyl phenols to include mono- and poly-alkyl or alkenyl phenols, the alkyl or alkenyl group containing from 3-100 carbons, such as 4 to 50 carbons and sulfurized derivatives thereof, the number of alkyl or alkenyl groups present in the aromatic ring ranging from 1 to up to the available unsatisfied valences of the aromatic ring remaining after counting the number of hydroxyl groups bound to the aromatic ring.

A phenolic anti-oxidant may be represented by the general formula:

$(R)_x$—Ar—$(OH)_y$ where Ar is selected from phenyl, naphthyl, biphenyl, 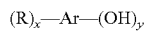

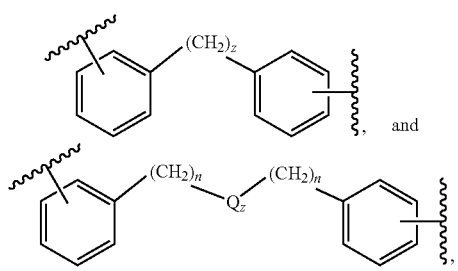

where R is a $C_3$-$C_{100}$ alkyl or alkenyl group, a sulfur substituted alkyl or alkenyl group, such as a $C_4$-$C_{50}$ alkyl or alkenyl group or sulfur substituted alkyl or alkenyl group, such as $C_3$-$C_{100}$ alkyl or sulfur substituted alkyl group, such as a $C_4$-$C_{50}$ alkyl group. Q is oxygen or sulfur. y is at least 1 to up to the available valences of Ar. x ranges from 0 to up to the available valances of Ar-y. z ranges from 1 to 10, n ranges from 0 to 20, and m is 0 to 4 and p is 0 or 1. In one embodiment, y ranges from 1 to 3, x ranges from 0 to 3, z ranges from 1 to 4 and n ranges from 0 to 5, and p is 0.

Phenolic anti-oxidant compounds can be the hindered phenolics and phenolic esters which contain a sterically hindered hydroxyl group, and these include those derivatives of dihydroxy aryl compounds in which the hydroxyl groups are in the o- or p-position to each other. Typical phenolic anti-oxidants include the hindered phenols substituted with C1+ alkyl groups and the alkylene coupled derivatives of these hindered phenols. Examples of phenolic materials of this type 2-t-butyl-4-heptyl phenol; 2-t-butyl-4-octyl phenol; 2-t-butyl-4-dodecyl phenol; 2,6-di-t-butyl-4-heptyl phenol; 2,6-di-t-butyl-4-dodecyl phenol; 2-methyl-6-t-butyl-4-heptyl phenol; 2-methyl-6-t-butyl-4-dodecyl phenol; 2,6-di-t-butyl-4 methyl phenol; 2,6-di-t-butyl-4-ethyl phenol; and 2,6-di-t-butyl 4-alkoxy phenol; and

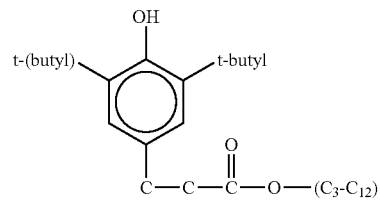

Phenolic type anti-oxidants in the lubricating industry include commercial examples such as Ethanox® 4710, Irganox® 1076, Irganox® L1035, Irganox® 1010, Irganox® L109, Irganox® L118, Irganox® L135 and the like.

The phenolic anti-oxidant can be present in a lubricating oil in an amount in the range of from 0.1 wt % to about 3 wt %, such as about 1 wt % to about 3 wt %, such as from about 1.5 wt % to about 3 wt % based on the weight of the lubricant oil.

Aromatic amine anti-oxidants include phenyl-a-naphthyl amine which is described by the following molecular structure:

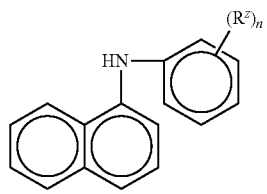

wherein $R^z$ is hydrogen or a $C_1$ to $C_{14}$ linear or $C_3$ to $C_{14}$ branched alkyl group, such as $C_1$ to $C_{10}$ linear or $C_3$ to $C_{10}$ branched alkyl group, such as linear or branched $C_6$ to $C_8$ and n is an integer ranging from 1 to 5, such as 1. A particular example is Irganox L06.

Other aromatic amine anti-oxidants include other alkylated and non-alkylated aromatic amines such as aromatic monoamines of the formula $R^8R^9R^{10}$ N where $R^8$ is an aliphatic, aromatic or substituted aromatic group, $R^9$ is an aromatic or a substituted aromatic group, and $R^{10}$ is H, alkyl, aryl or $R^{11}S(O)_xR^{12}$ where $R^{11}$ is an alkylene, alkenylene, or aralkylene group, $R^{12}$ is a higher alkyl group, or an alkenyl, aryl, or alkaryl group, and x is 0, 1 or 2. The aliphatic group $R^8$ may contain from 1 to 20 carbon atoms, or can contain from 6 to 12 carbon atoms. The aliphatic group is a saturated aliphatic group. For example, both $R^8$ and $R^9$ are aromatic or substituted aromatic groups, and the aromatic group may be a fused ring aromatic group such as naphthyl. Aromatic groups $R^8$ and $R^9$ may be joined together with other groups such as S.

Typical aromatic amine anti-oxidants have alkyl substituent groups of at least 6 carbon atoms. Examples of aliphatic groups include hexyl, heptyl, octyl, nonyl, and decyl. Generally, the aliphatic groups will not contain more than 14 carbon atoms. The general types of such other additional amine anti-oxidants which may be present include diphenylamines, phenothiazines, imidodibenzyls and diphenyl phenylene diamines. Mixtures of two or more of such other additional aromatic amines may also be present. Polymeric amine antioxidants can also be used.

Another class of anti-oxidant used in lubricating oil compositions and which may also be present are oil-soluble copper compounds. Any oil-soluble suitable copper compound may be blended into the lubricating oil. Examples of suitable copper antioxidants include copper dihydrocarbyl thio- or dithio-phosphates and copper salts of carboxylic acid (naturally occurring or synthetic). Other suitable copper salts include copper dithiacarbamates, sulphonates, phenates, and acetylacetonates. Basic, neutral, or acidic copper Cu(I) and or Cu(II) salts derived from alkenyl succinic acids or anhydrides are known to be particularly useful.

Such anti-oxidants may be used individually or as mixtures of one or more types of anti-oxidants, the total amount used in a lubricating oil being an amount of from about 0.50 wt % to about 5 wt %, such as about 0.75 wt % to about 3 wt %.

Detergents

Detergents may be included in lubricating oils of the present disclosure. In at least one embodiment, a detergent is an alkali or alkaline earth metal salicylate detergent.

A detergent can be alkali or alkaline earth metal phenates, sulfonates, carboxylates, phosphonates and mixtures thereof. The detergents can have total base number (TBN) ranging from neutral to highly overbased, e.g., TBN of 0 to 500 or greater, such as 2 to 400, such as 5 to 300, and they can be present either individually or in combination with each other in an amount in the range of from 0 wt % to about 10 wt %, such as about 0.5 wt % to about 5 wt % (active ingredient) based on the total weight of the formulated lubricating oil.

Other detergents can be calcium phenates, calcium sulfonates, magnesium phenates, magnesium sulfonates and other related components (including borated detergents).

Dispersants

During engine operation, oil-insoluble oxidation byproducts are produced. Dispersants help keep these byproducts in solution, thus diminishing their deposition on metal surfaces. Dispersants may be ashless or ash-forming. For example, the dispersant is ashless. So called ashless dispersants are organic materials that form substantially no ash upon combustion. For example, non-metal-containing or borated metal-free dispersants are considered ashless. In contrast, metal-containing detergents discussed above form ash upon combustion.

Suitable dispersants typically contain a polar group attached to a relatively high molecular weight hydrocarbon chain. The polar group typically contains at least one nitrogen, oxygen, or phosphorus atom. Typical hydrocarbon chains contain from about 50 to about 400 to carbon atoms.

In at least one embodiment, a dispersant is an alkenylsuccinic derivative, typically produced by the reaction of a long chain substituted alkenyl succinic compound, usually a substituted succinic anhydride, with a polyhydroxy or polyamino compound. The long chain group constituting the oleophilic portion of the molecule which confers solubility in the oil, is normally a polyisobutylene group. Exemplary U.S. patents describing such dispersants are U.S. Pat. Nos. 3,172,892; 3,219,666; 3,316,177 and 4,234,435. Other types of dispersant are described in U.S. Pat. Nos. 3,036,003 and 5,705,458.

Hydrocarbyl-substituted succinic acid compounds may be used as dispersants. In particular, succinimide, succinate esters, or succinate ester amides prepared by the reaction of a hydrocarbon-substituted succinic acid compound, such as those having at least about 50 carbon atoms in the hydrocarbon substituent, with at least one equivalent of an alkylene amine.

Succinimides are formed by the condensation reaction between alkenyl succinic anhydrides and amines. Molar ratios can vary depending on the amine or polyamine. For example, the molar ratio of alkenyl succinic anhydride to TEPA can vary from 1:1 to 5:1.

Succinate esters are formed by the condensation reaction between alkenyl succinic anhydrides and alcohols or polyols. Molar ratios can vary depending on the alcohol or polyol used. For example, the condensation product of an alkenyl succinic anhydride and pentaerythritol is a useful dispersant.

Succinate ester amides are formed by condensation reaction between alkenyl succinic anhydrides and alkanol amines. For example, suitable alkanol amines include ethoxylated polyalkylpolyamines, propoxylated polyalkylpolyamines and polyalkenylpolyamines such as polyethylene polyamines. One example is propoxylated hexamethylenediamine.

The molecular weight of the alkenyl succinic anhydrides will typically range from about 800 to about 2,500. The above products can be post-reacted with various reagents such as sulfur, oxygen, formaldehyde, carboxylic acids such as oleic acid, and boron compounds such as borate esters or highly borated dispersants. The dispersants can be borated with from 0.1 to 5 moles of boron per mole of dispersant reaction product.

Mannich base dispersants are made from the reaction of alkylphenols, formaldehyde, and amines. Process aids and catalysts, such as oleic acid and sulfonic acids, can also be part of the reaction mixture. Molecular weights of the alkylphenols range from about 800 to about 2,500.

Typical high molecular weight aliphatic acid modified Mannich condensation products can be prepared from high molecular weight alkyl-substituted hydroxyaromatics or $HN(R)_2$ group-containing reactants.

Examples of high molecular weight alkyl-substituted hydroxyaromatic compounds are polypropylphenol, polybutylphenol, and other polyalkylphenols. These polyalkylphenols can be obtained by the alkylation, in the presence of an alkylating catalyst, such as $BF_3$, of phenol with high molecular weight polypropylene, polybutylene, and other polyalkylene compounds to give alkyl substituents on the benzene ring of phenol having an average molecular weight of from about 600 to about 100,000.

Examples of $HN(R)_2$ group-containing reactants are alkylene polyamines, principally polyethylene polyamines. Other representative organic compounds containing at least one $HN(R)_2$ group suitable for use in the preparation of Mannich condensation products include the mono- and di-amino alkanes and their substituted analogs, e.g., ethylamine and diethanol amine; aromatic diamines, e.g., phenylene diamine, diamino naphthalenes; heterocyclic amines, e.g., morpholine, pyrrole, pyrrolidine, imidazole, imidazolidine, and piperidine; melamine and their substituted analogs.

Examples of alkylene polyamine reactants include ethylenediamine, diethylene triamine, triethylene tetraamine, tetraethylene pentaamine, pentaethylene hexamine, hexaethylene heptaamine, heptaethylene octaamine, octaethylene nonaamine, nonaethylene decamine, and decaethylene undecamine and mixture of such amines having nitrogen contents corresponding to the alkylene polyamines, in the formula $H_2N-(Z-NH-)_nH$, mentioned before, Z is a divalent ethylene and n is 1 to 10 of the foregoing formula. Corresponding propylene polyamines such as propylene diamine and di-, tri-, tetra-, pentapropylene tri-, tetra-, penta- and hexaamines are also suitable reactants. The alkylene polyamines are usually obtained by the reaction of ammonia and dihalo alkanes, such as dichloro alkanes. Thus the alkylene polyamines obtained from the reaction of 2 to 11 moles of ammonia with 1 to 10 moles of dichloroalkanes having 2 to 6 carbon atoms and the chlorines on different carbons are suitable alkylene polyamine reactants.

Aldehyde reactants useful in the preparation of the high molecular products useful in this disclosure include the aliphatic aldehydes such as formaldehyde (also as paraformaldehyde and formalin), acetaldehyde and aldol (β-hydroxybutyraldehyde). Formaldehyde or a form aldehyde-yielding reactant is exemplary.

Dispersants can include borated and non-borated succinimides, including those derivatives from mono-succinimides, bis-succinimides, and/or mixtures of mono- and bis-succinimides, wherein the hydrocarbyl succinimide is derived from a hydrocarbylene group such as polyisobutylene having a molecular weight of from about 500 g/mol to about 5000 g/mol or derived from a mixture of such hydrocarbylene groups. Other exemplary dispersants include succinic acid-esters and amides, alkylphenol-polyamine-coupled Mannich adducts, their capped derivatives, and other related components. Such additives may be used in an amount of 0.1 to 20 wt %, such as 0.1 to 8 wt %, such as 1 to 6 wt % (on an as-received basis) based on the weight of the total lubricant.

Pour Point Depressants

Pour point depressants (also known as lube oil flow improvers) may also be present in lubricating oils of the present disclosure. Pour point depressant may be added to lower the minimum temperature at which the fluid will flow or can be poured. Examples of suitable pour point depressants include alkylated naphthalenes polymethacrylates, polyacrylates, polyarylamides, condensation products of haloparaffin waxes and aromatic compounds, vinyl carboxylate polymers, and terpolymers of dialkylfumarates, vinyl esters of fatty acids and allyl vinyl ethers. Such additives may be used in amount of from 0 wt % to about 0.5 wt %, such as about 0.0001 wt % to about 0.3 wt %, such as about 0.001 wt % to about 0.1 wt % based on the weight of the lubricating oil.

Corrosion Inhibitors/Metal Deactivators

Corrosion inhibitors are used to reduce the degradation of metallic parts that are in contact with the lubricating oil composition. Suitable corrosion inhibitors include aryl thiazines, alkyl substituted dimercapto thiodiazoles, thiadiazoles and mixtures thereof. Such additives may be used in an amount of about 0.01 wt % to about 5 wt %, such as about 0.01 wt % to about 1.5 wt %, such as about 0.01 wt % to about 0.2 wt %, such as about 0.01 wt % to about 0.1 wt % based on the total weight of the lubricating oil.

Seal Compatibility Additives

Seal compatibility agents help to swell elastomeric seals by causing a chemical reaction in the fluid or physical change in the elastomer. Suitable seal compatibility agents for lubricating oils include organic phosphates, aromatic esters, aromatic hydrocarbons, esters (butylbenzyl phthalate, for example), and polybutenyl succinic anhydride and sulfolane-type seal swell agents such as Lubrizol 730-type seal swell additives. Such additives may be used in an amount of from about 0.01 wt % to about 3 wt %, such as about 0.01 wt % to about 2 wt % based on the total weight of the lubricating oil.

Anti-Foam Agents

Anti-foam agents may be included in lubricant oils of the present disclosure. These agents retard the formation of stable foams. Silicones and organic polymers are typical anti-foam agents. For example, polysiloxanes, such as silicon oil or polydimethyl siloxane, provide antifoam properties. Anti-foam agents are commercially available and may be used in conventional minor amounts along with other additives such as demulsifiers; usually the amount of these additives combined is about 1 wt % or less, such as from about 0.001 wt % to about 0.5 wt %, such as from about 0.001 wt % to about 0.2 wt %, such as from about 0.0001 wt % to about 0.15 wt % based on the total weight of the lubricating oil.

Inhibitors and Antirust Additives

Anti-rust additives (or corrosion inhibitors) are additives that protect lubricated metal surfaces against chemical attack by water or other contaminants. One type of anti-rust additive is a polar compound that wets the metal surface, protecting the metal surface with a film of oil. Another type of anti-rust additive absorbs water by incorporating it in a water-in-oil emulsion so that only the oil touches the metal surface. Yet another type of anti-rust additive chemically adheres to the metal to produce a non-reactive surface. Examples of suitable additives include zinc dithiophosphates, metal phenolates, basic metal sulfonates, fatty acids and amines. Other anti-wear additives include zinc dithiocarbamates, molybdenum dialkyldithiophosphates, molybdenum dithiocarbamates, other organo molybdenum-nitrogen complexes, sulfurized olefins, etc. Such additives may be used in an amount of from about 0.01 wt % to about 5 wt %, such as from about 0.01 wt % to about 1.5 wt % based on the total weight of the lubricating oil.

The term "organo molybdenum-nitrogen complexes" embraces the organo molybdenum-nitrogen complexes described in U.S. Pat. No. 4,889,647. The complexes are reaction products of a fatty oil, dithanolamine and a molybdenum source. Specific chemical structures have not been assigned to the complexes. U.S. Pat. No. 4,889,647 reports an infrared spectrum for a typical reaction product of that disclosure; the spectrum identifies an ester carbonyl band at 1740 cm-1 and an amide carbonyl band at 1620 cm-1. The fatty oils are glyceryl esters of higher fatty acids containing at least 12 carbon atoms up to 22 carbon atoms or more. The molybdenum source is an oxygen-containing compound such as ammonium molybdates, molybdenum oxides and mixtures.

Other organo molybdenum complexes which can be used are tri-nuclear molybdenum-sulfur compounds described in EP 1 040 115 and WO 99/31113 and the molybdenum complexes described in U.S. Pat. No. 4,978,464.

Diesel Fuels

In at least one embodiment, a diesel fuel is a $C_6$-$C_{100}$ hydrogenated polyolefin product, such as a $C_6$-$C_{25}$ hydrogenated polyolefin product.

Generally, diesel engines operate well with a cetane number of from 48 to 50. Fuels with a lower cetane number have longer ignition delays, requiring more time for the fuel combustion process to be completed. Hence, higher speed diesel engines operate more effectively to with higher cetane number fuels. A hydrogenated polyolefin product of the present disclosure can be useful as a diesel fuel, as indicated by advantageous cetane numbers. For example, a hydrogenated polyolefin product can have a cetane number of about 30 or greater, such as about 40 or greater, such as about 45 or greater, such as about 48 or greater, such as about 50 or greater, such as about 60 or greater, such as about 70 or greater, such as about 80 or greater, such as about 90 or greater.

EXPERIMENTAL

General Methods. All manipulations of air- and/or water-sensitive compounds were carried out under dry nitrogen using a Braun UniLab drybox or standard Schlenk techniques. $^1$H and $^{13}$C NMR spectra of polymers were recorded on a Bruker (400 MHz) spectrometer and referenced versus residual nondeuterated solvent shifts. The product samples were dissolved in chloroform-d or toluene-d8 in a 5-mm O.D. tube. Average molecular weights were estimated by NMR spectra from the integrations of olefinic and alkyl protons. The kinematic viscosities at 40° C. and 100° C. were measured using a Stabinger viscometer. The results were then used to calculate the viscosity index. The glass transition temperature (Tg) and melting temperature (Tm) were determined using a differential scanning calorimeter (DSC).

Materials. Toluene was purchased from Millipore and dried over fresh 4A molecular sieves before use. Chloroform was purchased from Aldrich and dried over 4A molecular sieves before use. 1-Pentene, 1-hexene, 1-heptene, 1-octene, 1-decene (Aldrich) and 2-octene, 4-octene (Alfa Aeser) were stirred over molecular sieves for several days and stored under nitrogen prior to use. MAO (7 wt % Al in toluene), dimethylaluminum chloride (1.0 M solution in hexane), diethylaluminum chloride (0.9 M solution in toluene), diethylaluminum ethoxide, aluminum oxide, and nickel(II) chloride ethylene glycol dimethyl ether complex were purchased from Sigma-Aldrich and used as received.

Preparation of catalyst ligand and precursors. The diimine ligands were prepared based on literature procedures. The nickel dibromide complexes were prepared by stirring ligand and Nickel (II) bromide ethylene glycol dimethyl ether complex (1.1:1 molar ratio) in dichloromethane overnight, collecting solid by filtration, washing solid with hexane, and drying in vacuo. The Pd Diimines were prepared and isolated in a similar manner as the Ni complexes from ligand and dichloro (1,5-cyclooctadiene) palladium (II) (1.1:1 molar ratio).

General procedure for olefin oligomerization. Oligomerization reactions were carried out in oven dried glass vials equipped with Teflon stir bars in a nitrogen atmosphere. After the desired reaction time (from 2 hours to 24 hours), the reactions were quenched with acidic water, to stir bars were removed, and vials were centrifuged at 1500-2000 rpm in an IEC Centra MP4 centrifuge. The organic layers were filtered through 5 g Florisil® columns, washing with hexanes, and concentrated to dryness under vacuum.

Examples 1-6

Examples 1-6 were prepared using catalyst precursors with the general structure represented by Formula (I):

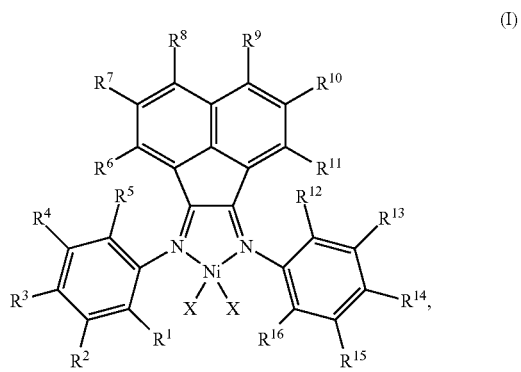

wherein each of $R^2$, $R^3$, $R^4$, $R^6$, $R^7$, $R^8$, $R^9$, $R^{10}$, $R^{11}$, $R^{13}$, $R^{14}$, and $R^{15}$ is hydrogen and each of IV, $R^5$, $R^{12}$, and $R^{16}$ is independently selected from hydrogen, methyl, isopropyl, or fluorine.

The catalyst precursors were activated using MMAO-12 and then the general procedure for olefin polymerization was performed. The compositions and properties of isolated olefin oligomers were analyzed and compared with reference materials.

The molecular structures of the examples and reference materials were analyzed using both $^{13}$C and $^1$H NMR spectroscopy. The $^{13}$C NMR differentiates the types of carbon in the structures (e.g. $CH_3$, $CH_2$, CH and C). The specific types of carbons that were found to be of interest are epsilon-carbon (e-$CH_2$) at ~28.5-31.5 ppm chemical shifts region; isolated methyl ($CH_3$) at ~20 ppm chemical shift; methyl ($CH_3$) from propyl, butyl and longer linear carbon chains (14-15 ppm chemical shifts) and methyl ($CH_3$) from ethyl side chains (~12 ppm chemical shifts).

Figure 2:
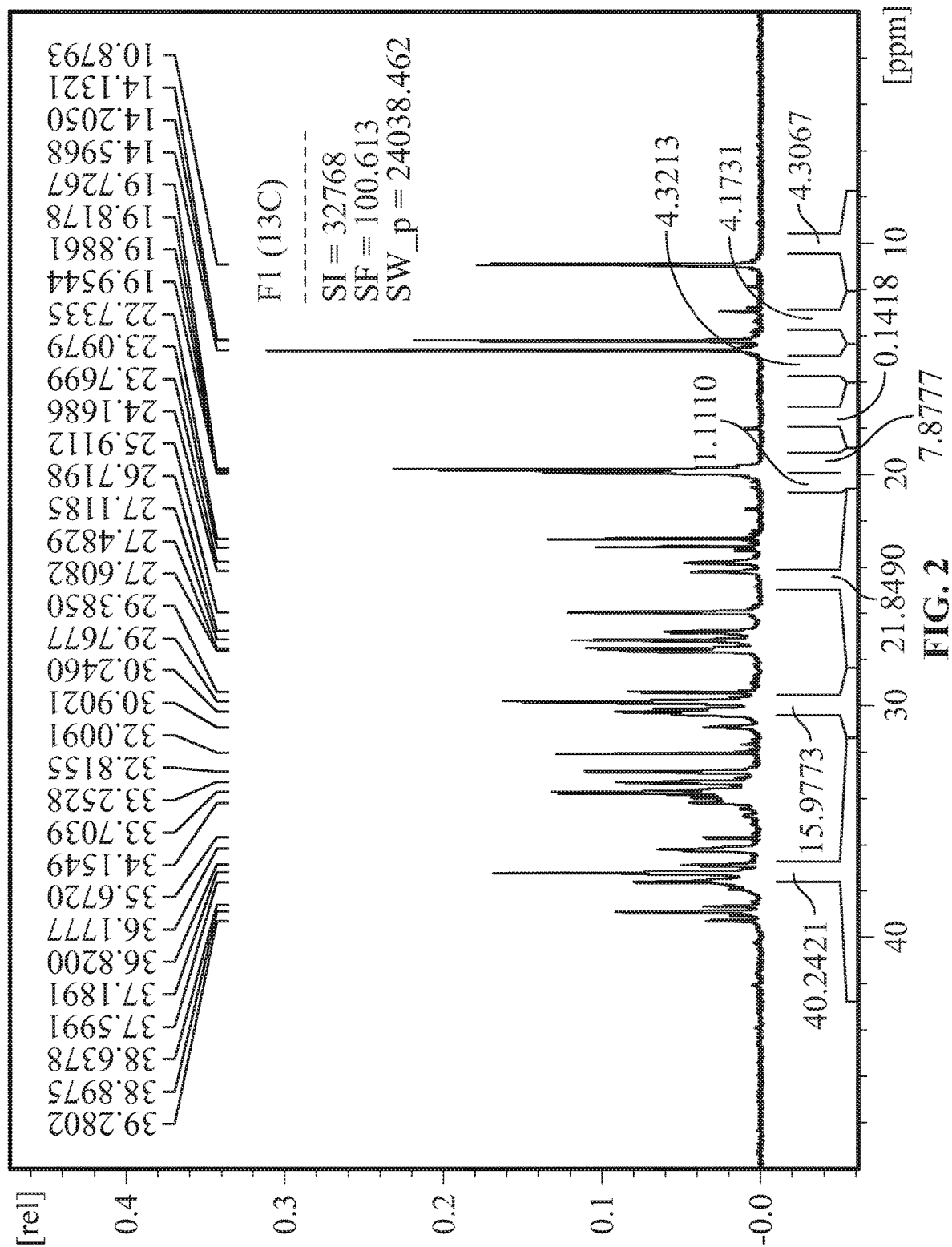
FIG. 2 is a quantitative $^{13}C$ NMR spectrum of Example 4, according to one embodiment.
Figure 3:
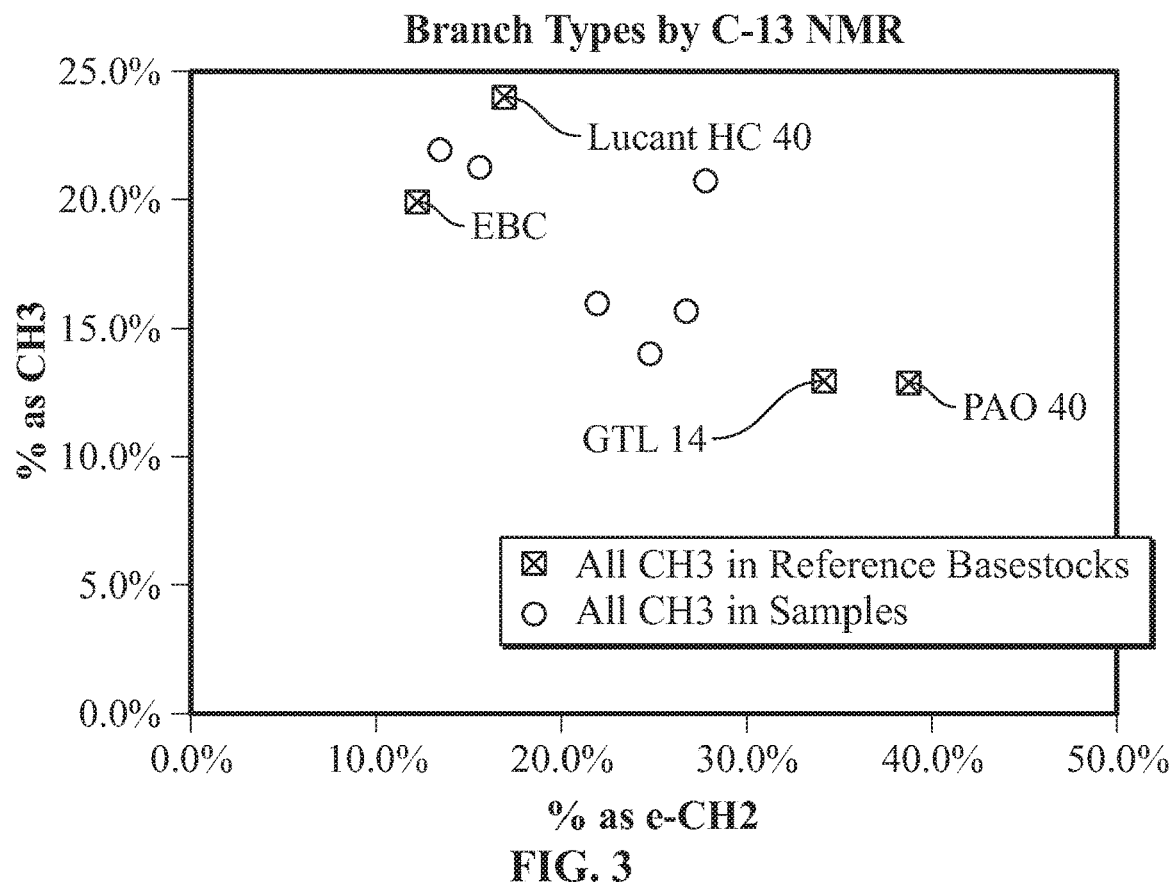
FIG. 3 is a graph illustrating the total $CH_3$ content in relation to the amount of epsilon-$CH_2$ of polyolefin products, according to one embodiment.

The $^{13}$C NMR DEPT-135 technique was used to differentiate $CH_3$ (10-20 ppm) and CH (32-40 ppm) as positive peaks and $CH_2$ as negative peaks. The quantitative $^{13}$C technique was used to determine the amount of different carbon types in the composition. The C-13 NMR spectra of Example 4 are shown in FIGS. 1 and 2. Table 2 below illustrates physical and chemical to properties of Sample 1-6 and several comparative base stocks which are commercially available. The relationship of total $CH_3$ and e-$CH_2$ of the novels compositions is similar to other high quality base stocks. As shown in FIG. 3, the amount of e-$CH_2$ is inversely related to the total $CH_3$ meaning that the higher e-$CH_2$ Examples have lower total $CH_3$.

(DEPT procedure: 256 scans, 2 second relaxation delay (T1), and a standard Bruker NMR instrument Parameter Set was used.)

TABLE 2

| | | Samples | | | |
|---|---|---|---|---|---|
| | Example 1 | Example 2 | Example 3 | Example 4 | Example 5 |
| Catalyst I | $R^1$=$R^{12}$=iPr | $R^1$=$R^{12}$=iPr | $R^1$=$R^{12}$=iPr | $R^1$=$R^{12}$=Me | $R^1$=$R^{12}$=Me |
| Feed Materials | 1-pentene | 1-hexene | 1-octene | Hexene Mixtures* | Octene Mixtures* |
| Kinematic Viscosity @100° C. | 47.04 | 34.5 | 22.35 | 57.11 | 62.26 |

TABLE 2-continued

| | | | | | |
|---|---|---|---|---|---|
| Kinematic Viscosity @40° C. | 408.6 | 272.0 | 139.3 | 582.0 | 646.7 |
| Viscosity Index | 174.8 | 173.8 | 189.5 | 164.2 | 183.6 |
| Density @15.6 C., g/cc | 0.8403 | 0.8397 | 0.8359 | 0.8464 | 0.8441 |
| Molecular Weight | 855 | 926 | 795 | 1092 | 1045 |
| C-13 NMR Quantitative (Fraction) | | | | | |
| e-Carbons, CH2, 29-30 ppm | 0.1342 | 0.2675 | 0.2276 | 0.1557 | 0.2186 |
| CH3 from Methyl/Ethyl, 20 and 8-12 ppm | 0.1158 | 0.0646 | 0.0771 | 0.1187 | 0.0678 |
| CH3 from Propyl/Butyl+ 14-15 ppm | 0.1033 | 0.0916 | 0.1303 | 0.0828 | 0.0920 |
| Total CH3 | 0.2191 | 0.1562 | 0.2074 | 0.2015 | 0.1599 |
| Differential Scanning Calorimetry | | | | | |
| Glass Transition Temperature (Tg)° C. | −86.8 | −87.7 | −92.8 | −83.4 | −85.7 |
| Melting Temperature | None detected | −39.2 | −44.2 | None detected | None detected |

| | Samples | | | | |
|---|---|---|---|---|---|
| | Example 6 | Reference GTL14 | Reference Lucant HC40 | Reference PAO40 | Reference EBC |
| Catalyst I | $R^1=R^{12}=Me$ | NA | NA | NA | NA |
| Feed Materials | Decene Mixtures* | Wax | Ethylene/Propylene | C8-C12 LAO | Ethylene/Butene |
| Kinematic Viscosity @100° C. | 235.37 | 14.3 | 39.8 | 39.2 | 138.2 |
| Kinematic Viscosity @40° C. | 2914.3 | 95.0 | 400 | 396.2 | 2674 |
| Viscosity Index | 214.3 | 155 | 149 | 147 | 143 |
| Density @15.6 C., g/cc | 0.8501 | 0.8334 | 0.8373 | 0.8483 | 0.8599 |
| Molecular Weight | 1948 | — | — | — | — |
| C-13 NMR Quantitative (Fraction) | | | | | |
| e-Carbons, CH2, 29-30 ppm | 0.2471 | 0.3415 | 0.1692 | 0.3868 | 0.1219 |
| CH3 from Methyl/Ethyl, 20 and 8-12 ppm | 0.0460 | 0.0883 | 0.2201 | 0.0088 | 0.1870 |
| CH3 from Propyl/Butyl+ 14-15 ppm | 0.0937 | 0.0409 | 0.0196 | 0.1198 | 0.0124 |
| Total CH3 | 0.1397 | 0.1292 | 0.2398 | 0.1286 | 0.1994 |
| Differential Scanning Calorimetry | | | | | |
| Glass Transition Temperature (Tg)° C. | −78.5 | −71.1 | −75.0 | −72.2 | Not measured |
| Melting Temperature | None detected | −35.4 | None detected | None detected | Not measured |

*= an equilibrium mixture of hexene, octene, or decene by heating 1-hexene, 1-octene or 1-decene, respectively, over an aluminum oxide catalyst at 250° C. for 24 hours.

Figure 4:
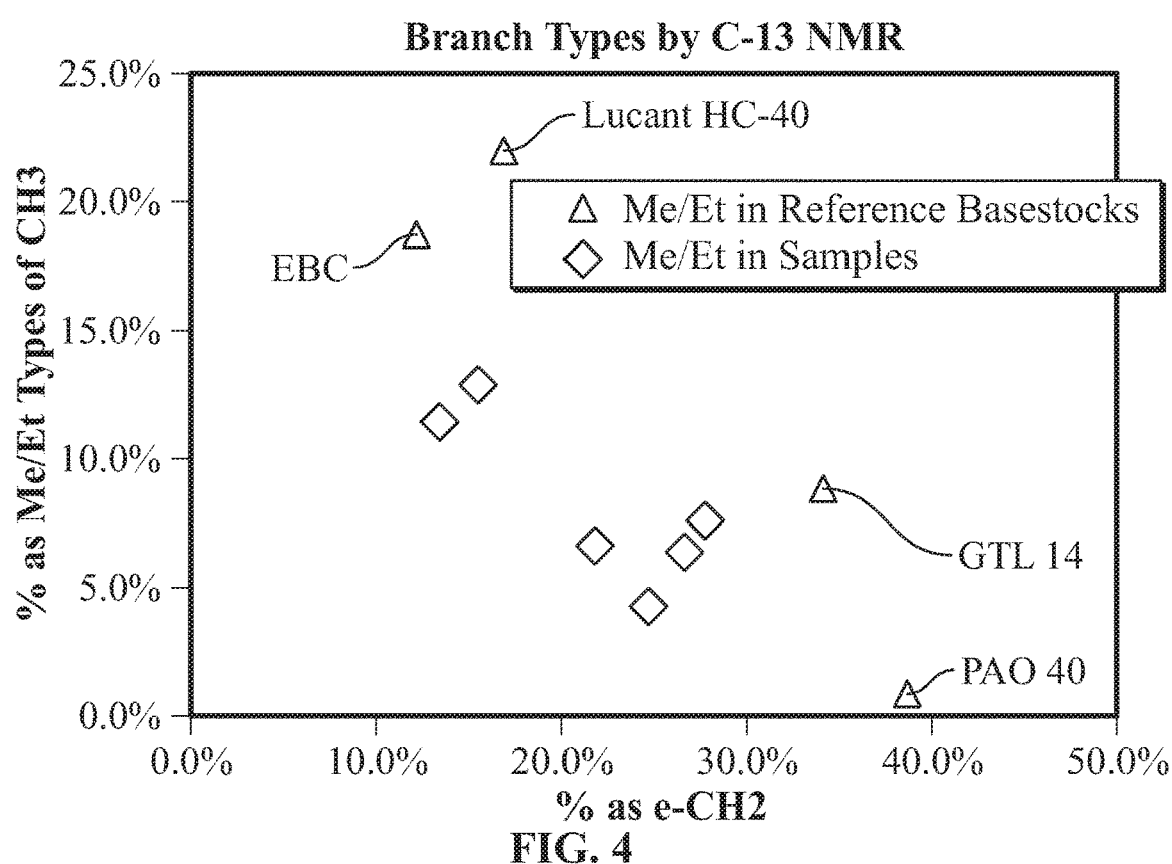
FIG. 4 is a graph illustrating the amount of $CH_3$ content from methyl/ethyl in relation to the amount of epsilon-$CH_2$ of polyolefin products, according to one embodiment.
Figure 5:
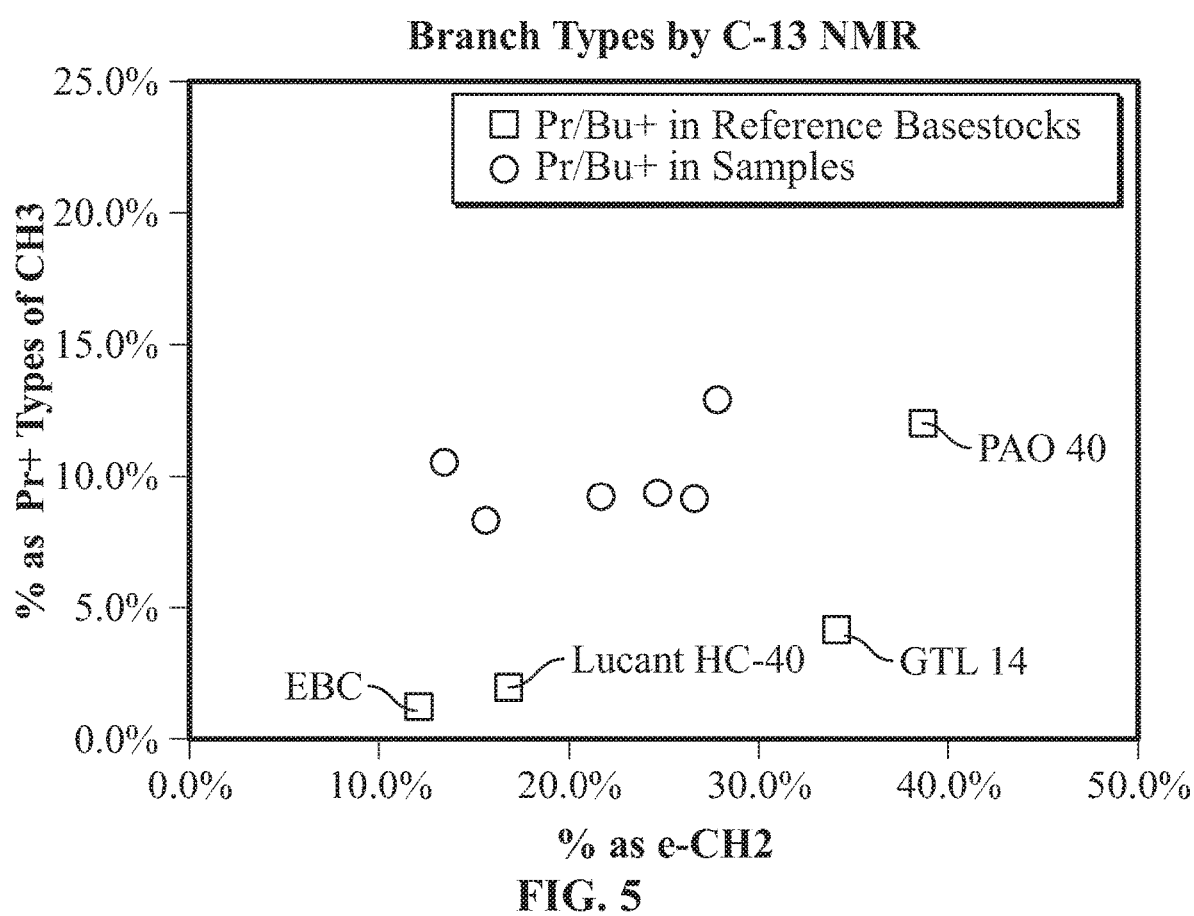
FIG. 5 is a graph illustrating the amount of $CH_3$ content from propyl/butyl in relation to the amount of epsilon-$CH_2$ of polyolefin products, according to one embodiment.

In addition, while no significant difference in the relationship of e-CH$_2$ to total CH$_3$ was observed for all of the high quality base stocks, the amount of specific types of CH$_3$ in the novel compositions is unique and is shown in FIGS. 4 and 5. The amount of CH$_3$ from either Methyl/Ethyl or Propyl/Butyl groups was relatively constant in the range of 5-15% regardless of the amount of e-CH$_2$ present. In contrast, the reference base stocks showed that their CH$_3$ from Methyl/Ethyl is inversely related to e-CH$_2$ (FIG. 4) and their CH$_3$ from Propyl/Butyl was proportional to e-CH$_2$ (FIG. 5).

Figure 6:
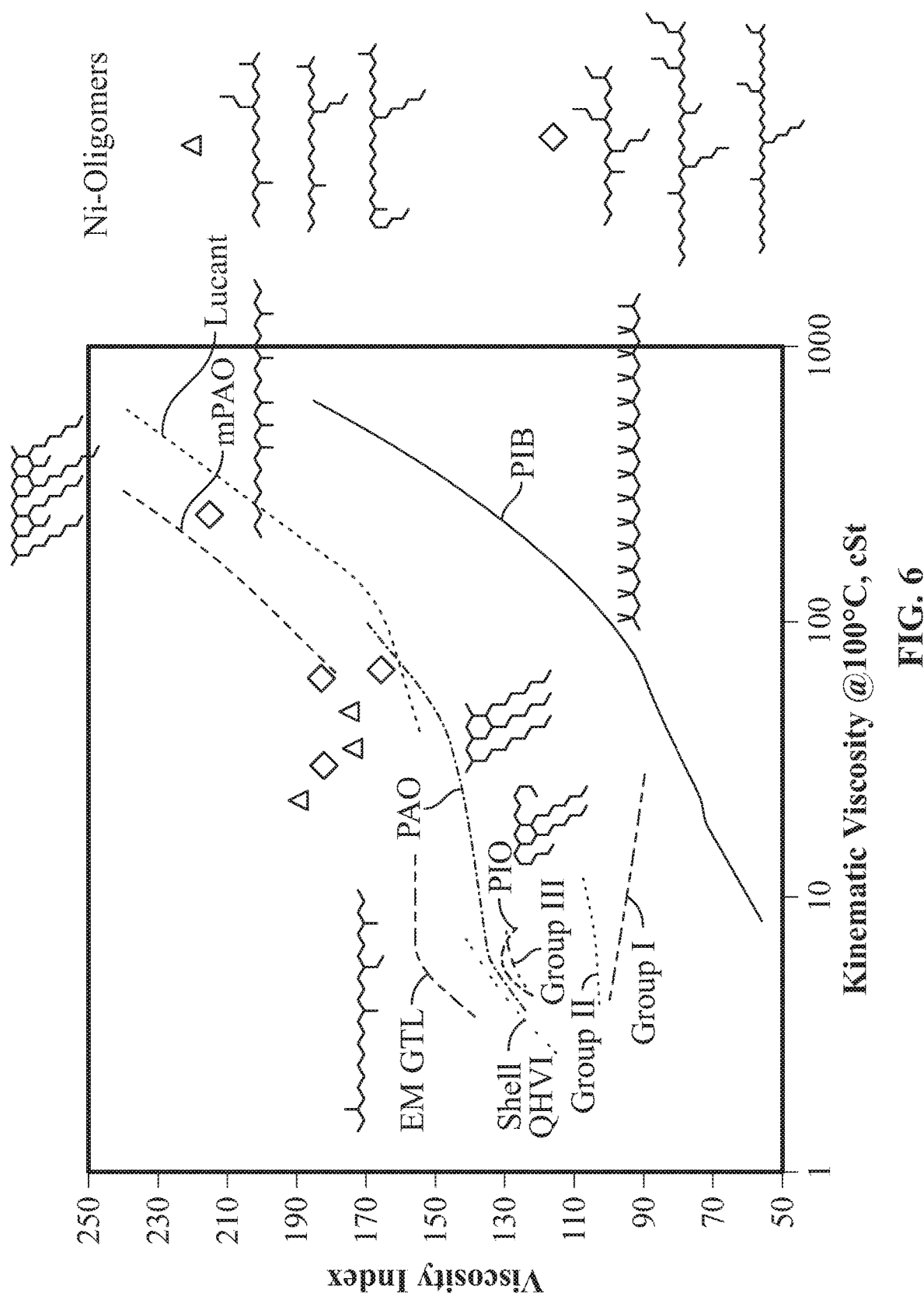
FIG. 6 is a graph illustrating kinematic viscosity @ 100° C. versus viscosity index of polyolefin products, according to one embodiment.

In addition, the unique structures of the new compositions manifest in other physical properties. While these new base stock compositions have viscosity and viscosity index relationships similar to the high quality mPAO base stock, they have significantly higher viscosity and viscosity index relationships than PAO, EPC (tradename Lucant) and polyisobutylene (PIB) (FIG. 6).

Figure 7:
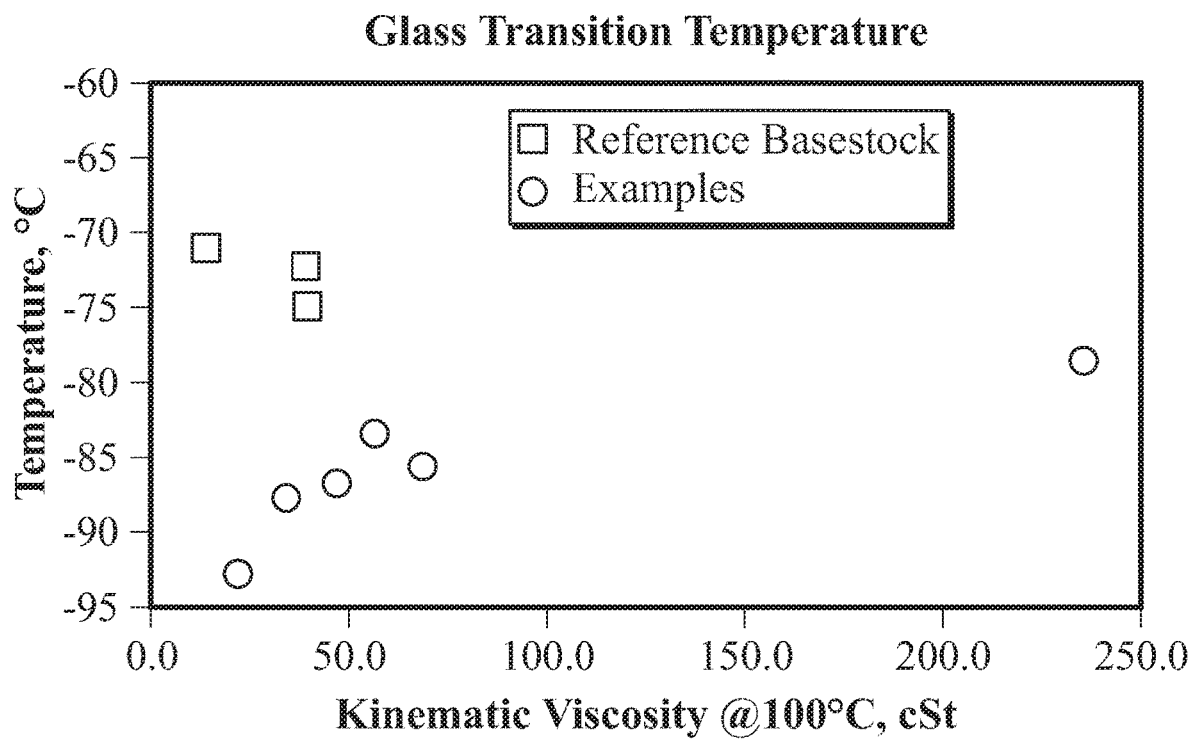
FIG. 7 is a graph illustrating kinematic viscosity @ 100° C. versus glass transition temperature of polyolefin products, according to one embodiment.

In addition, the novel compositions demonstrate lower glass transition temperature (Tg) than reference base stocks that are known for their low Tg suggesting even better fluidity at the extreme low temperature operations, as shown in FIG. 7.

Figure 8:
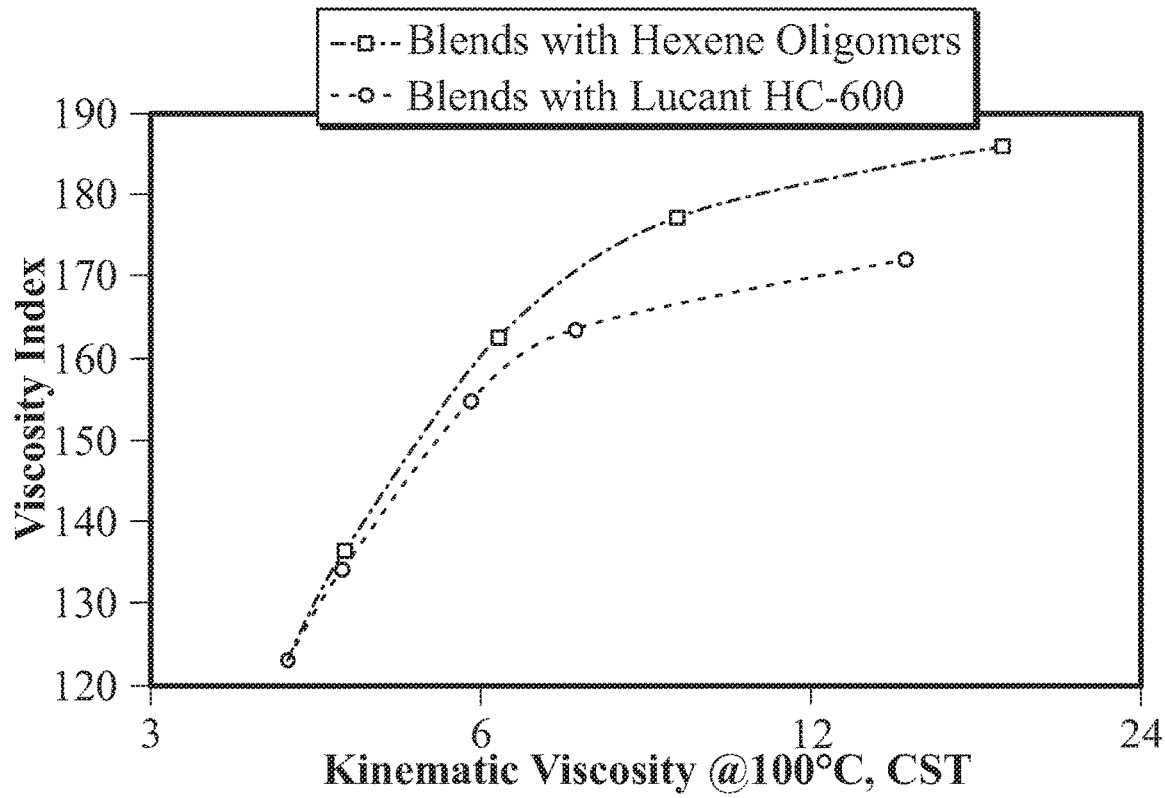
FIG. 8 is a graph illustrating kinematic viscosity @ 100° C. versus viscosity index of polyolefin products, according to one embodiment.

Besides functioning as base stocks, the novel compositions in high viscosity (high molecular weight) region can also be used as a blending component, such as a viscosity modifier, as shown in the use of Example 7 of Table 3. Example 7 is a composition made from a equilibrium mixture of hexenes (1-hexene, 2-hexenes and 3-hexenes). The use of the mixed hexene oligomers as a thickener was compared to a known material (EPC, tradename Lucant HC-600). At the same viscosity at 100° C., the blends containing the new composition showed up to viscosity index unit higher than blends containing Lucant HC600. (FIG. 8).

TABLE 3

| | Samples | | | | | |
|---|---|---|---|---|---|---|
| | Example 7 | | | Lucant HC-600 | | |
| | Material Type | | | | | |
| | Mixed Hexenes Oligomers | | | Ethylene/Propylene Oligomers | | |
| Properties | KV100C, cSt | KV40C, cSt | Viscosity Index | KV100C, cSt | KV40C, cSt | Viscosity Index |
| 1% in PAO4 | 4.51 | 20.55 | 136 | 4.48 | 20.53 | 134 |
| 5% in PAO4 | 6.23 | 30.18 | 162 | 5.88 | 28.74 | 155 |
| 10% in PAO4 | 9.06 | 47.21 | 177 | 7.32 | 37.61 | 164 |
| 20% in PAO4 | 17.92 | 107.0 | 186 | 14.64 | 89.05 | 172 |

On the lower molecular weight range (e.g. $C_{10}$-$C_{25}$) side, the sample compositions can be achieved with appropriate catalyst systems as shown in Table 4.

TABLE 4

| | Example 8 | Example 9 (Comp) |
|---|---|---|
| Feed Material | 2-Octene | 2-Octene |
| Catalyst System | Ni-Diimine/MAO | $BF_3$-etherate |
| Product Analyzed By Gas Chromatography (FIGS. 11/12) | | |
| % Linear C16 isomers that hydrogenated to Isomer A | 13.7% | 0.0% |
| Products Analyzed By $^1$H NMR (FIG. 11) | | |
| % as di-substituted olefins (~5.4 ppm) | 68.4% | 4.0% |
| % as tri-substituted olefins (~5.1 ppm) | 24.8% | 92.3% |
| % as alpha olefins (~4.9 ppm) | 4.2% | 0.0% |
| % as vinylidene (~4.7 ppm) | 2.6% | 3.6% |

The gas chromatograms (FIG. 9) of Examples 8 showed a mixtures of >20 different isomers of $C_{16}$ olefin product. However, once hydrogenated, the number of isomers was reduced to four (shown as A, B, C and D) indicating that there were only four skeletal configurations such as A (linear with no branch), B (a methyl branch), C (an ethyl branch) and D (a propyl branch) with at most one branching point. The apparent complex mixture (>20 isomers) is the result of all possible regio-isomers (locations of double bonds) and geometric-isomers (cis and trans) of the four configurations. Hydrogenation conditions used were 150° C., 400 psi Hydrogen over a nickel catalyst on Kieselguhr catalyst for 4 hours to 18 hours.

Figure 9:
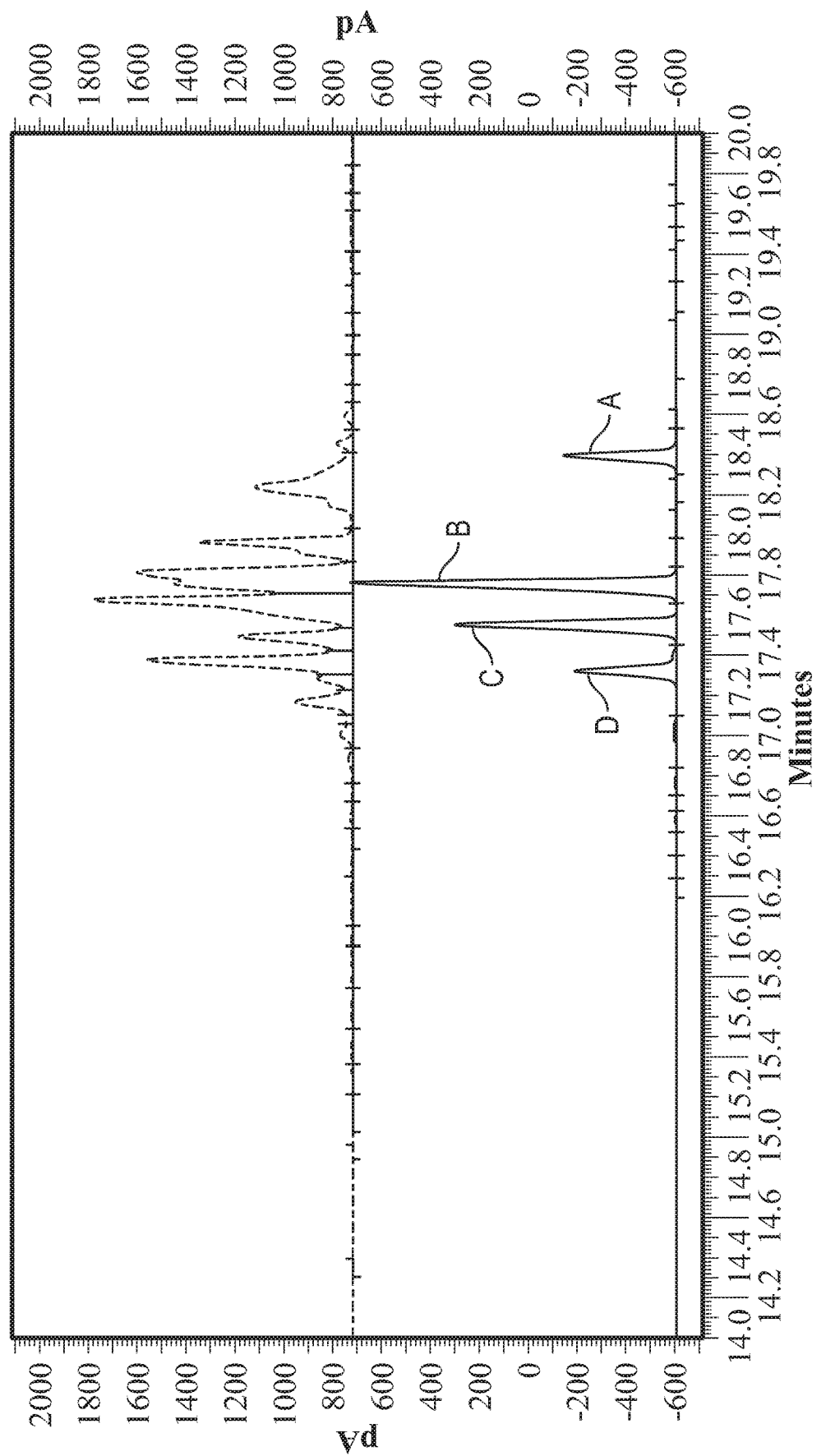
FIG. 9 is gas chromatograms of polyolefin products, according to one embodiment.

FIG. 9: Gas Chromatograms of Example 8 (top) and Hydrogenated Example 8 (bottom) in the $C_{16}$ region. The four skeletal $C_{16}H_{34}$ isomers of the Hydrogenated Example 8 are identified by GC/MS from left to right as (D) 5-propyltridecane, 13%, (C) 6-ethyltetradecane, 29%, (B) 7-methylpentadecane, 44% and (A) n-hexadecane, 14%.

Figure 10:
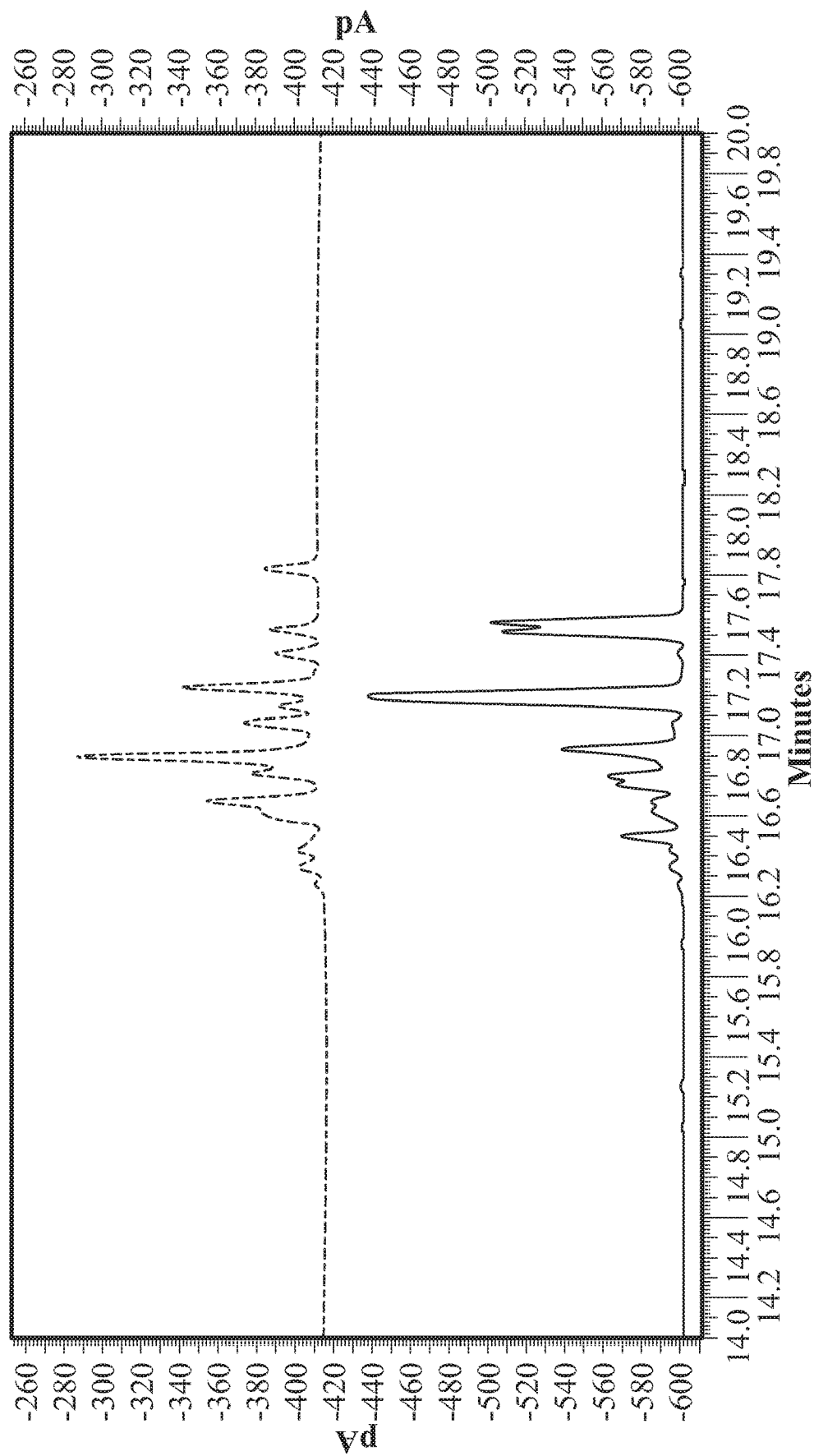
FIG. 10 is gas chromatograms of polyolefin products, according to one embodiment.

FIG. 10: Gas Chromatograms of Example 9 (top) and Hydrogenated Example 9 (bottom) in the $C_{16}$ region.

Figure 11:
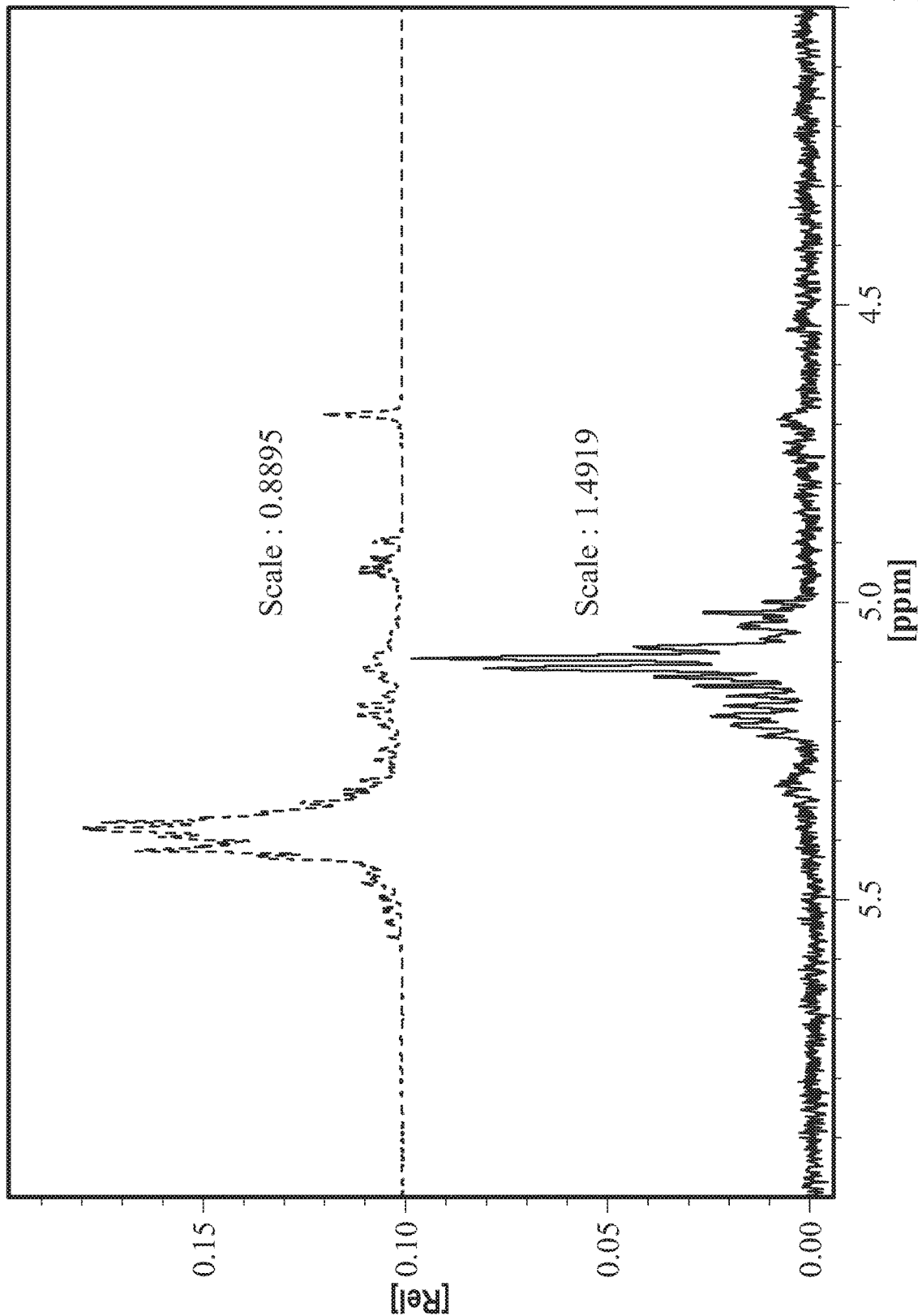
FIG. 11 is $^1H$ NMR spectra illustrating the olefinic proton region according to polyolefin products, according to one embodiment.

FIG. 11: $^1$H NMR spectra of olefinic proton region of Example 8 (top) and Example 9 (bottom).

The simplicity of the skeletal configuration is unique when compared to acid catalyzed dimerization of the same olefin that typically yields product structures with highly branched products from the well-studied carbocation chemistry. For comparison, in Example 9, the dimers of 2-octene made by $BF_3$-etherate catalyst showed significantly lower GC retention times indicating lower boiling point and more branched isomers (FIG. 10). The gas chromatogram of the hydrogenated Example 9 also showed greater number of lower boiling skeletal isomers consistent with its olefinic precursors.

Another difference of the new compositions is the type of olefins present. $^1$H NMR of Example 8 (FIG. 11) showed that they are mostly substituted olefins (5.4 ppm region) and lesser amount of tri-substituted olefins (5.1 ppm region) plus small quantities of vinylidenes (4.7 ppm region) and alpha olefins (4.9 ppm), in contrast to oligomers based on carbocation chemistry which contain mostly tri-substituted olefins (typically in the 5.1 ppm region) as shown by Example 9. Di-substituted olefins, vinylidenes and alpha olefins are known to be more chemically reactive than tri-substituted olefins. The novel compositions with higher amount of the more reactive olefins can provide a benefit.

Diesel Hydrocarbon Compositions

Polymerization of linear olefins was performed as follows:

In a 20 mL glass vial, a mixture of selected olefin(s) (1 mL each), toluene (5 mL), adamantane (internal GC integration standard), and catalyst were added. The catalyst used in these examples was $(NN-Ph)NiBr_2$ or $(NN-Ph-iPr)NiBr_2$ (5-10 mg), shown below. The results were analyzed by both GC and 1H NMR.

Figure 12:
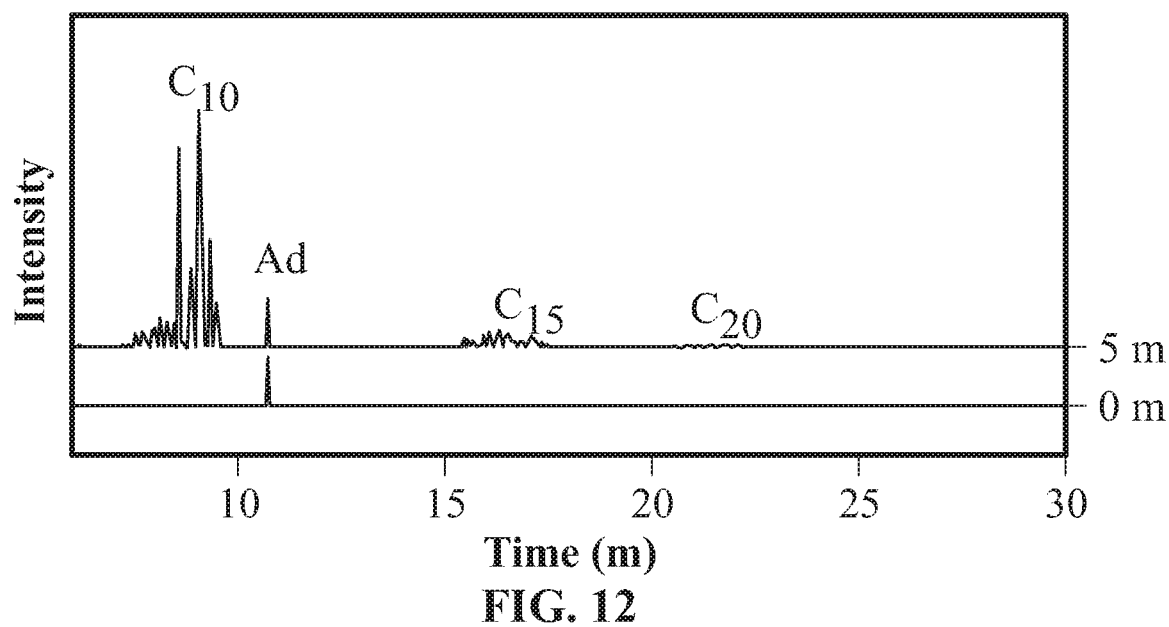
FIG. 12 is a gas chromatogram of polyolefin products formed from 1-pentene with (NN-Ph)$NiBr_2$/MAO after 5 mins, according to one embodiment.

Example 10 demonstrates the oligomerization of 1-pentene with $(NN-Ph)NiBr_2$/MAO giving 95% conversion after 5 mins, with a catalyst loading of 0.2 mol %. Of the oligomerized product, ~70% were dimers, and ~23% were trimers. The GC analysis of the dimers and trimers is shown in FIG. 12.

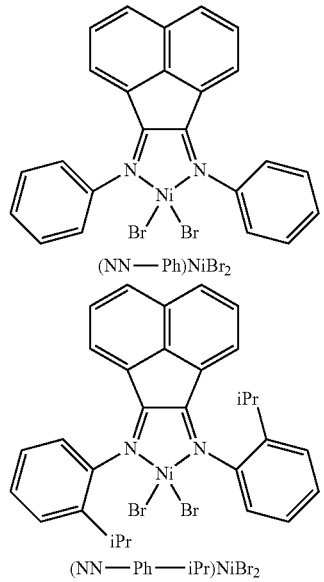

$(NN-Ph)NiBr_2$ $(NN-Ph-iPr)NiBr_2$

Figure 13:
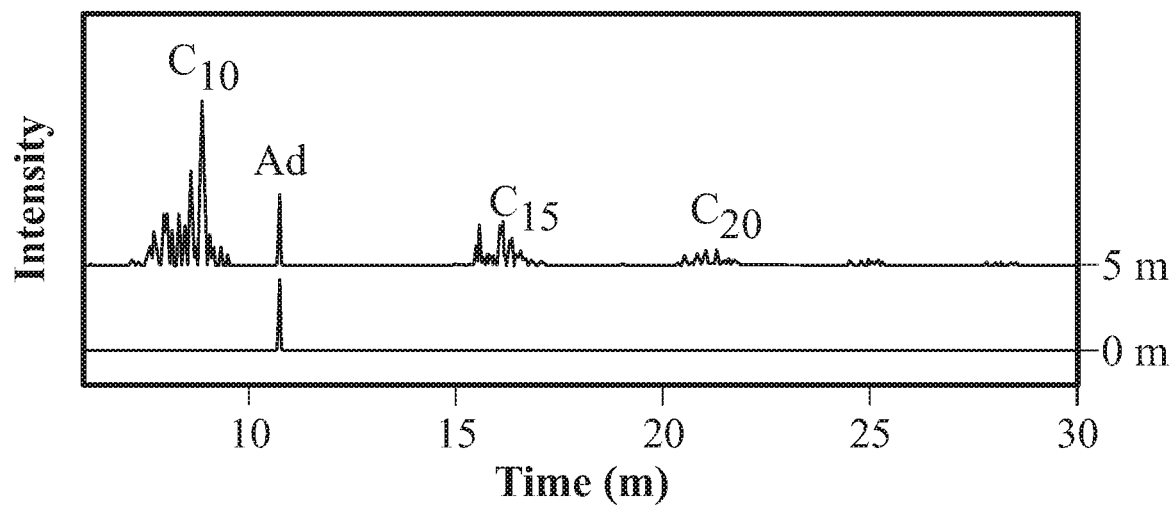
FIG. 13 is a gas chromatogram of polyolefin products formed from 2-pentene with (NN-Ph)$NiBr_2$/MAO after 5 mins, according to one embodiment FIG. 14 are overlaid gas chromatograms of dimers formed based on pentene starting material with (NN-Ph)$NiBr_2$/MAO, according to one embodiment.

Example 11 demonstrates the oligomerization of 2-pentene, under similar conditions as to Example 10, also provides primarily dimers and trimers. The GC analysis is shown in FIG. 13.

Example 12 demonstrated the oligomerization of trans-2-pentene, under similar conditions as Example 10 to give a similar oligomerized product as Example 11.

Example 13 demonstrated the oligomerization of trans-2-pentene with (NN-Ph-iPr)NiBr$_2$/MAO to give the oligomerized products that are mostly tetramers and higher oligomers of pentene.

TABLE 5

|  | Example | | | |
|---|---|---|---|---|
|  | 10 | 11 | 12 | 13 |
| Catalyst | (NN—Ph)NiBr$_2$ | (NN—Ph)NiBr$_2$ | (NN—Ph)NiBr$_2$ | (NN—Ph-iPr)NiBr$_2$ |
| Feed Materials | 1-Pentene | cis/trans 2-Pentene | trans-2-Pentene | trans-2-Pentene |
| Feed Isomerization | Yes | Yes | No | No |
| Selectivity | | | | |
| Dimers, C10 | 70% | 40% | 40% | 0% |
| Trimers, C15 | 23% | 20% | 20% | 0% |
| Tetramers+, C25+ | 7% | 40% | 40% | 100% |

|  | Example | | |
|---|---|---|---|
|  | 14 | 15 | 16 |
| Catalyst | (NN—Ph)NiBr$_2$ | (NN—Ph-iPr)NiBr$_2$ | (NN—Ph)NiB$_2$ + (NN—Ph-iPr)NiBr$_2$ |
| Feed Materials | cis-2-Pentene | cis-2-Pentene | cis-2-Pentene |
| Feed Isomerization | Yes | No | Yes |
| Selectivity | | | |
| Dimers, C10 | 79% | 0% | 40% |
| Trimers, C15 | 18% | 0% | 7% |
| Tetramers+, C25+ | 3% | 0% | 53% |

Figure 14:
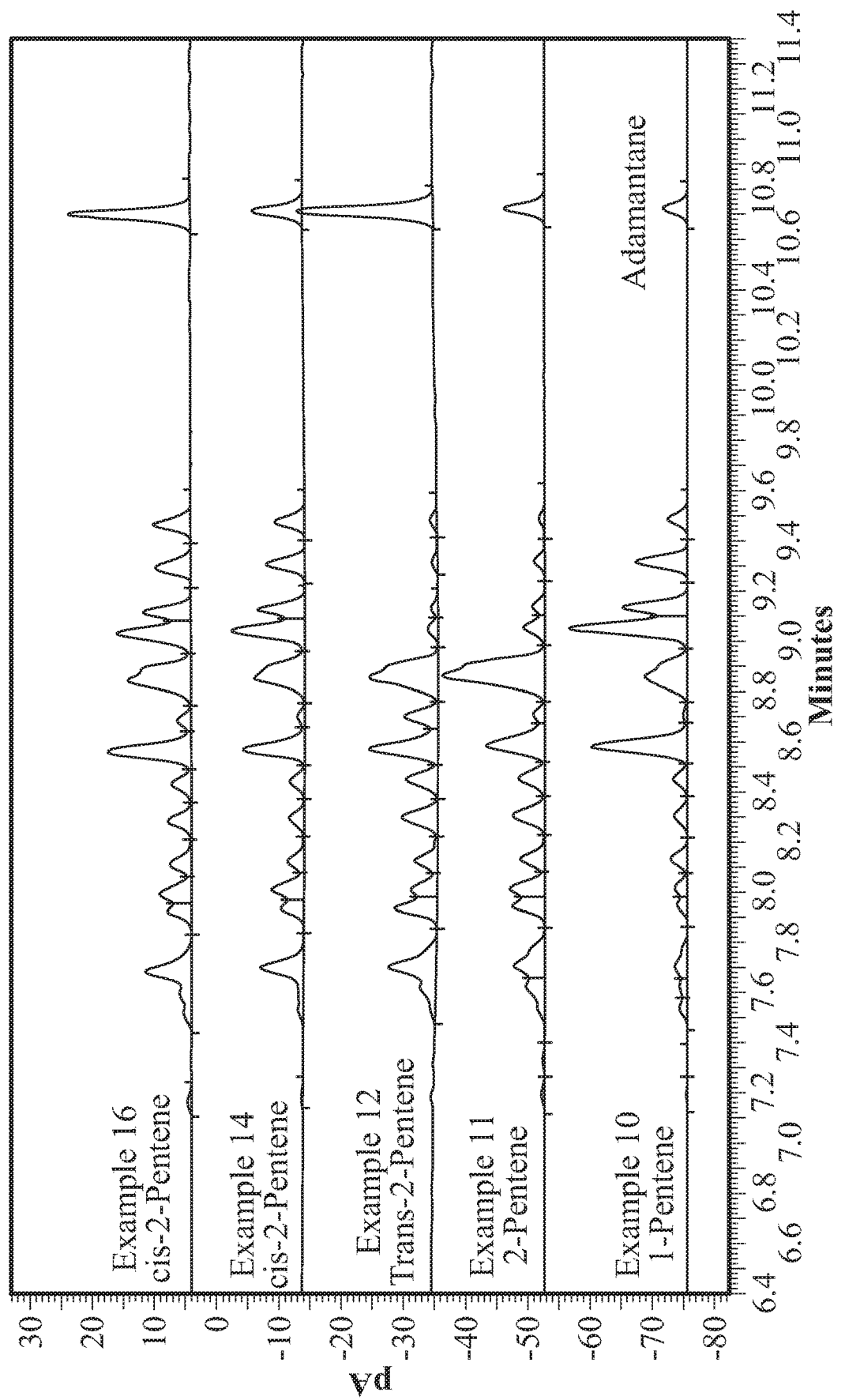
Figure 15:
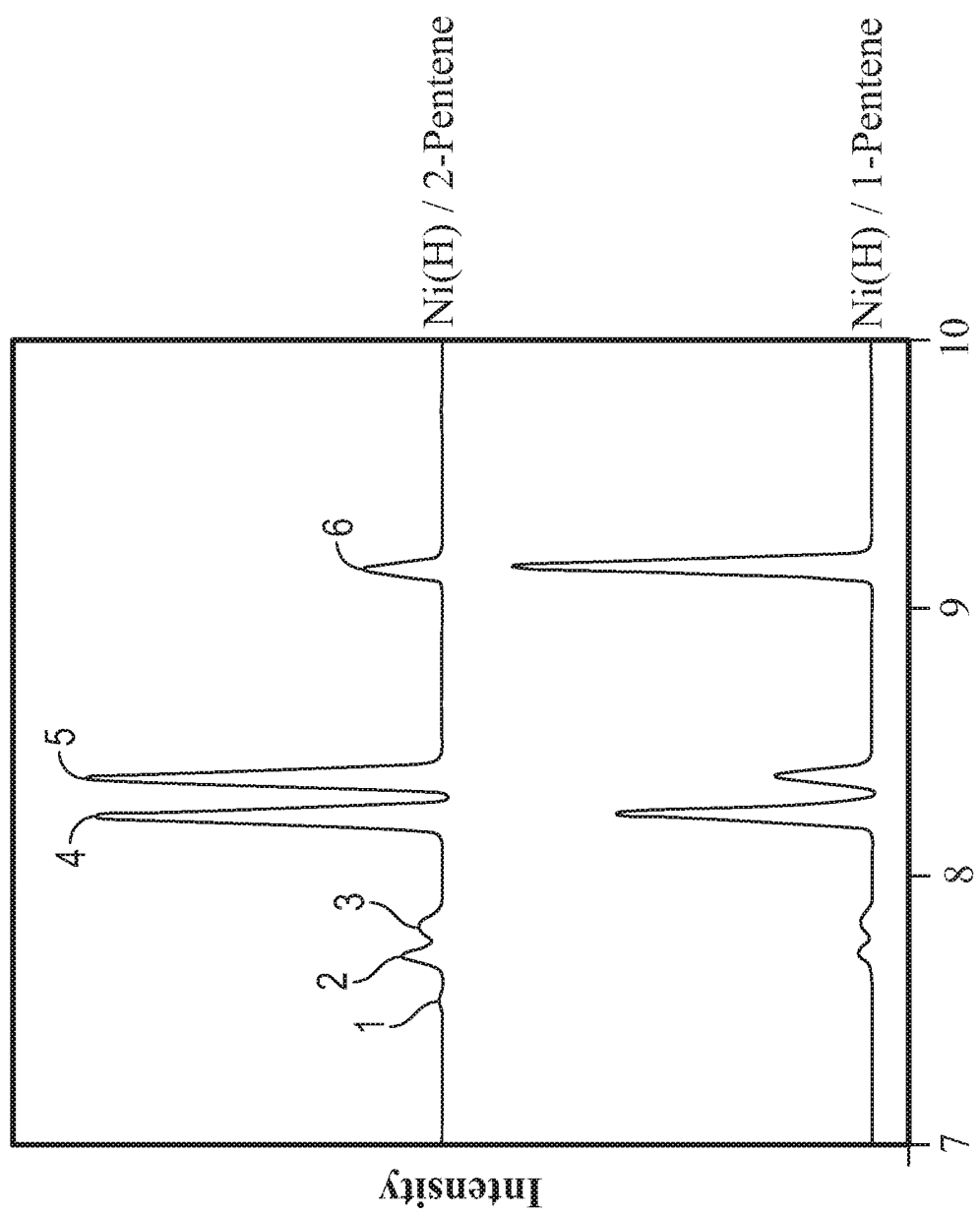
FIG. 15 is an illustration including gas chromatograms of hydrogenated polyolefin products formed from 1-pentene and 2-pentene with (NN-Ph)$NiBr_2$/MAO, according to one embodiment.

The dimers formed in Examples 10, 11 and 12 have been compared for clarity, and are shown in FIG. 14. The dimers were also hydrogenated, and then analyzed by GC to assess the branching and approximate cetane numbers for the molecules produced. These results are shown in FIG. 15 and tabulated in Table 6. The estimated cetane number of the oligomers generated is from: Oil and Gas Journal, Feb. 8, 2010.

TABLE 6

| Peak # | Name | Cetane Number | 1-pentene | 2-pentene |
|---|---|---|---|---|
| 1 | 3-Ethyl,4-methylheptane |  | <1% | <1% |
| 2 | 3,4-Diethylhexane |  | 2% | 5% |
| 3 | 4,5-Dimethyloctane(s) |  | 3% | 4% |
| 4 | 4-Methylnonane | 61 | 36% | 41% |
| 5 | 3-Ethyloctane | 55 | 13% | 41% |
| 6 | Decane | 77 | 46% | 8% |

Dual Catalyst Systems

The examples below demonstrate polymerization of linear cis-olefins by using a two catalyst system. In a typical experiment, the following conditions were employed:

In a 20 mL glass vial, cis-2-pentene (1 mL), toluene (5 mL), adamantane (internal GC integration standard), and catalyst(s) were added. The catalysts used in these examples are shown below (5-10 mg each). The results were analyzed by both GC and 1H NMR.

Example 14 was carried out to demonstration that the oligomerization catalyst (NN-Ph)NiBr$_2$/MAO gave mostly dimers and trimers. The results were analyzed by GC.

Example 15 was carried out to demonstrate that the oligomerization catalyst (NN-Ph-iPr)NiBr$_2$/MAO gave no observable conversion of cis-2-pentene to oligomers. GC analysis showed no oligomer formation, and monitoring the disappearance of the starting cis-2-pentene olefin also indicated no conversion.

Example 16 demonstrates that with two catalysts, namely (NN-Ph-iPr)NiBr$_2$ and (NN-Ph-iPr)NiBr$_2$ with MAO, conversion to oligomeric product was observed, in addition to the formation of isomerized cis-2-pentene starting material and shorter oligomeric material.

The dimers formed in Examples 14 and 16 have been compared for clarity, and are shown in FIG. 14.

Lastly, Example 17 demonstrates that with a dual catalyst system of (NN-Ph-iPr)NiBr$_2$ and (NN-Ph-iPr)PdBr$_2$ with MAO, isomerization was observed, and oligomerization was limited.

Overall, processes of the present disclosure provide polymerization of low molecular weight internal olefins. Polyolefin products and hydrogenated polyolefin products of the present disclosure can provide one or more of improved flow, low temperature properties, thickening efficiency, and cetane number.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including". Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A process comprising:
   introducing a $C_4$-$C_{30}$ internal-olefin feed with a catalyst system comprising a nickel diimine catalyst; and
   obtaining a $C_6$-$C_{100}$ polyolefin product having one or more of:
   a carbon fraction of epsilon-carbons of from about 0.08 to about 0.3,
   a carbon fraction of $CH_3$ from (methyl+ethyl) of from about 0.02 to about 0.15,
   a carbon fraction of $CH_3$ from (propyl+butyl+longer carbon chains) of from about 0.06 to about 0.2, and
   a carbon fraction of total $CH_3$ of from about 0.1 to about 0.3, as determined by $^{13}C$ NMR spectroscopy, based on a total carbon content of the polyolefin product.

2. The process of claim 1, wherein the catalyst system further comprises a palladium diimine catalyst.

3. The process of claim 1, wherein the polyolefin product is a $C_{10}$-$C_{25}$ polyolefin product.

4. The process of claim 1, wherein the catalyst system further comprises an alkyl alumoxane.

5. The process of claim 1, wherein introducing is performed in the presence of a solvent and the solvent is selected from n-hexane, n-heptane, cyclohexane, benzene, toluene, xylenes, or any mixture thereof.

6. The process of claim 1, wherein introducing is performed free of a solvent.

7. The process of claim 1, wherein a molar ratio of nickel diimine catalyst to palladium diimine catalyst is from about 0.5:1 to about 1:0.5.

8. The process of claim 7, wherein the molar ratio is about 1:1.

9. The process of claim 1, wherein introducing is performed at a temperature of from about −25° C. to about 25° C.

10. The process of claim 9, wherein a reaction time is from about 1 minute to about 30 minutes.

11. The process of claim 1, wherein the nickel diimine catalyst is represented by Formula (I):

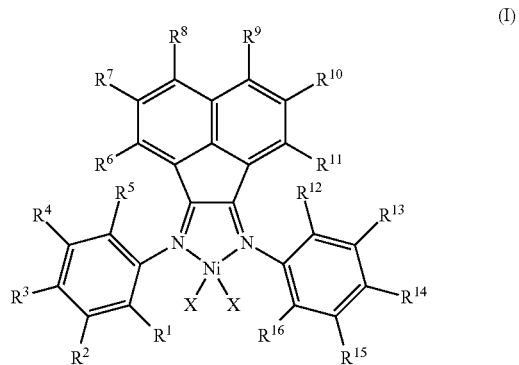

wherein:
each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ is independently selected from hydrogen, $C_1$-$C_{40}$ hydrocarbyl, $C_1$-$C_{40}$ substituted hydrocarbyl, or a halogen, and
each X is independently selected from $C_1$-$C_{20}$ hydrocarbyl, $C_1$-$C_{20}$ substituted hydrocarbyl, or a halogen.

12. The process of claim 11, wherein $R^1$ and $R^{16}$ are hydrogen and each of $R^5$ and $R^{12}$ is independently selected from $C_1$-$C_{40}$ hydrocarbyl, $C_1$-$C_{40}$ substituted hydrocarbyl, or a halogen.

13. The process of claim 11, wherein each of $R^2$, $R^3$, $R^4$, $R^6$, $R^7$, $R^8$, $R^9$, $R^{10}$, $R^{11}$, $R^{13}$, $R^{14}$, and $R^{15}$ is hydrogen and each of $R^1$, $R^5$, $R^{12}$, and $R^{16}$ is independently selected from hydrogen, methyl, isopropyl, or fluorine.

14. The process of claim 2, wherein the palladium diimine catalyst is represented by Formula (II):

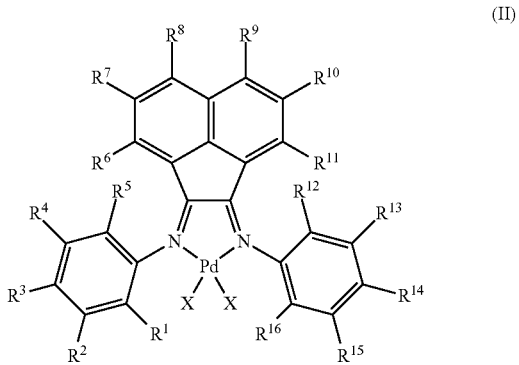

wherein:
each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ is independently selected from hydrogen, $C_1$-$C_{40}$ hydrocarbyl, $C_1$-$C_{40}$ substituted hydrocarbyl, or a halogen, and
each X is independently selected from $C_1$-$C_{20}$ hydrocarbyl, $C_1$-$C_{20}$ substituted hydrocarbyl, or a halogen.

15. The process of claim 14, wherein $R^1$ and $R^{16}$ of the palladium catalyst are hydrogen and each of $R^5$ and $R^{12}$ of the palladium catalyst is independently selected from $C_1$-$C_{40}$ hydrocarbyl, $C_1$-$C_{40}$ substituted hydrocarbyl, or a halogen.

16. The process of claim 14, wherein each of $R^2$, $R^3$, $R^4$, $R^6$, $R^7$, $R^8$, $R^9$, $R^{10}$, $R^{11}$, $R^{13}$, $R^{14}$, and $R^{15}$ of the palladium diimine catalyst is hydrogen and each of $R^1$, $R^5$, $R^{12}$, and $R^{16}$ of the palladium diimine catalyst is independently selected from hydrogen, methyl, isopropyl, or fluorine.

17. The process of claim 1, wherein the polyolefin product has:
   a carbon fraction of epsilon-carbons of from about 0.13 to about 0.24,
   a carbon fraction of $CH_3$ from (methyl+ethyl) of from about 0.05 to about 0.12,
   a carbon fraction of $CH_3$ from (propyl+butyl+longer carbon chains) of from about 0.08 to about 0.13, and
   a carbon fraction of total $CH_3$ of from about 0.13 to about 0.21, as determined by $^{13}C$ NMR spectroscopy, based on the total carbon content of the polyolefin product.

18. The process of claim 1, wherein the polyolefin product has a viscosity index of about 120 or greater, as determined according to ASTM D2270.

19. The process of claim 18, wherein the polyolefin product has a viscosity index of about 150 or greater, as determined according to ASTM D2270.

20. The process of claim 1, wherein the polyolefin product has a kinematic viscosity at 100° C. of from about 50 cSt to about 100 cSt, as determined by ASTM D445.

21. The process of claim 1, wherein the polyolefin product has a kinematic viscosity at 40° C. of from about 470 cSt to about 1,100 cSt, as determined by ASTM D445.

22. The process of claim 1, wherein the polyolefin product has a glass transition temperature of from about −110° C. to about −50° C., as determined by differential scanning calorimetry (DSC).

23. The process of claim 22, wherein the polyolefin product has a glass transition temperature of from about −95° C. to about −85° C., as determined by differential scanning calorimetry (DSC).

24. The process of claim 1, wherein the polyolefin product has one or more of:
   a di-substituted olefin content of from about 30% to about 80%,
   a tri-substituted olefin content of from about 1% to about 50%,
   a vinyl content of from about 0.5% to about 10%, and
   a vinylidene content of from about 0.1% to about 10%, based on total unsaturations of the polyolefin product, as determined by $^1H$ NMR spectroscopy.

25. The process of claim 24, wherein the polyolefin product has:
   a di-substituted olefin content of from about 60% to about 70%,
   a tri-substituted olefin content of from about 20% to about 40%,
   a vinyl content of from about 1% to about 4%, and
   a vinylidene content of from about 0.5% to about 3%, based on total unsaturations of the polyolefin product, as determined by $^1H$ NMR spectroscopy.

26. The process of claim 1, further comprising hydrogenating the polyolefin product to form a hydrogenated polyolefin product.

27. The process of claim 26, wherein the hydrogenated polyolefin product has a methylene content of from about 1 wt % to about 30 wt %, as determined by $^1H$ NMR spectroscopy.

28. The process of claim 27, wherein the hydrogenated polyolefin product has a methylene content of from about 10 wt % to about 15 wt %, as determined by $^1H$ NMR spectroscopy.

29. The process of claim 26, wherein the hydrogenated polyolefin product has a cetane number of about 45 or greater.

30. The process of claim 29, wherein the hydrogenated polyolefin product has a cetane number of about 70 or greater.

31. The process of claim 1, wherein the feed is from a refinery stream.

32. The process of claim 1, wherein the feed comprises a dilute olefin stream.

33. A $C_6$-$C_{100}$ polyolefin product having one or more of:
   a carbon fraction of epsilon-carbons of from about 0.08 to about 0.3,
   a carbon fraction of $CH_3$ from (methyl+ethyl) of from about 0.02 to about 0.15,
   a carbon fraction of $CH_3$ from (propyl+butyl+longer carbon chains) of from about 0.06 to about 0.2, and
   a carbon fraction of total $CH_3$ of from about 0.1 to about 0.3, as determined by $^{13}C$ NMR spectroscopy, based on a total carbon content of the polyolefin product.

34. The polyolefin product of claim 33, wherein the polyolefin product is a $C_{10}$-$C_{25}$ polyolefin product.

35. The polyolefin product of claim 33, wherein the polyolefin product has:
   a carbon fraction of epsilon-carbons of from about 0.13 to about 0.24,
   a carbon fraction of $CH_3$ from (methyl+ethyl) of from about 0.05 to about 0.12,
   a carbon fraction of $CH_3$ from (propyl+butyl+longer carbon chains) of from about 0.08 to about 0.13, and
   a carbon fraction of total $CH_3$ of from about 0.13 to about 0.21, as determined by $^{13}C$ NMR spectroscopy, based on the total carbon content of the polyolefin product.

36. The polyolefin product of claim 33, wherein the polyolefin product has a viscosity index of about 120 or greater, as determined according to ASTM D2270.

37. The polyolefin product of claim 35, wherein the polyolefin product has a viscosity index of about 150 or greater, as determined according to ASTM D2270.

38. The polyolefin product of claim 33, wherein the polyolefin product has a kinematic viscosity at 100° C. of from about 50 cSt to about 100 cSt, as determined by ASTM D445.

39. The polyolefin product of claim 33, wherein the polyolefin product has a kinematic viscosity at 40° C. of from about 470 cSt to about 1,100 cSt, as determined by ASTM D445.

40. The polyolefin product of claim 33, wherein the polyolefin product has a glass transition temperature of from about −110° C. to about −50° C., as determined by differential scanning calorimetry (DSC).

41. The polyolefin product of claim 39, wherein the polyolefin product has a glass transition temperature of from about −95° C. to about −85° C., as determined by differential scanning calorimetry (DSC).

42. The polyolefin product of claim 33, wherein the polyolefin product has one or more of:
   a di-substituted olefin content of from about 30% to about 80%,
   a tri-substituted olefin content of from about 1% to about 50%,
   a vinyl content of from about 0.5% to about 10%, and
   a vinylidene content of from about 0.1% to about 10%, based on total unsaturations of the polyolefin product, as determined by $^1H$ NMR spectroscopy.

43. The polyolefin product of claim 33, wherein the polyolefin product has:
- a di-substituted olefin content of from about 60% to about 70%,
- a tri-substituted olefin content of from about 20% to about 40%,
- a vinyl content of from about 1% to about 4%, and
- a vinylidene content of from about 0.5% to about 3%, based on total unsaturations of the polyolefin product, as determined by $^1$H NMR spectroscopy.

44. A hydrogenated $C_6$-$C_{100}$ polyolefin product having:
- a methylene content of from about 1 wt % to about 30 wt %, as determined by $^1$H NMR spectroscopy, and
- a cetane number of about 45 or greater.

45. The hydrogenated polyolefin product of claim 44, wherein the polyolefin product is a hydrogenated $C_{10}$-$C_{25}$ polyolefin product.

46. The hydrogenated polyolefin product of claim 44, wherein the hydrogenated polyolefin product has:
- a methylene content of from about 10 wt % to about 15 wt %, as determined by $^1$H NMR spectroscopy, and
- a cetane number of about 70 or greater.

47. A lubricating base oil comprising:
a polyolefin product of any of claims 33 to 46; and
one or more additives,
wherein the lubricating base oil has one or more of:
- a viscosity index of about 120 or greater, as determined according to ASTM D2270,
- a KV100 of from about 2 cSt to about 25 cSt, as determined by ASTM D445, and
- a KV40 of from about 10 cSt to about 125 cSt, as determined by ASTM D445.

48. The lubricating base oil of claim 47, wherein the lubricating base oil comprises from about 1 wt % to about 25 wt % of the polyolefin product, based on a weight of the lubricating oil, and the lubricating oil has:
- a viscosity index is about 150 or greater, as determined according to ASTM D2270,
- a KV100 of from about 4 cSt to about 10 cSt, as determined by ASTM D445, and
- a KV40 of from about 20 cSt to about 50 cSt, as determined by ASTM D445.

* * * * *